(12) United States Patent
Bouve

(10) Patent No.: US 9,151,617 B2
(45) Date of Patent: *Oct. 6, 2015

(54) SELECTED DRIVER NOTIFICATION OF TRANSITORY ROADTRIP EVENTS

(71) Applicant: TRIP ROUTING TECHNOLOGIES, INC., Hilton Head, SC (US)

(72) Inventor: Thomas Bouve, Annapolis, MD (US)

(73) Assignee: TRIP ROUTING TECHNOLOGIES, LLC, Hilton Head Island, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,294

(22) Filed: Oct. 7, 2013

(65) Prior Publication Data

US 2014/0039791 A1 Feb. 6, 2014

Related U.S. Application Data

(63) Continuation of application No. 12/900,736, filed on Oct. 8, 2010, now Pat. No. 8,566,026.

(51) Int. Cl.
| | |
|---|---|
| G01C 21/00 | (2006.01) |
| G01C 21/26 | (2006.01) |
| H04W 4/00 | (2009.01) |
| G01C 21/36 | (2006.01) |

(52) U.S. Cl.
CPC ............ *G01C 21/00* (2013.01); *G01C 21/3697* (2013.01)

(58) Field of Classification Search
CPC ........... H04W 4/00; H04W 8/22; H04W 4/02; G06Q 10/08; G06Q 50/00; G08G 1/096811; G08G 1/096872; G08G 1/096775; G06F 19/327; G06F 17/30887; G01C 21/00; G01C 21/3697; G01C 21/26; G01C 21/3407; G01C 21/3679
USPC ............... 701/411, 423; 455/456.3, 517, 521; 257/59; 705/51; 340/988
See application file for complete search history.

(56) References Cited

U.S. PATENT DOCUMENTS

| | | | |
|---|---|---|---|
| 5,272,638 A | 12/1993 | Martin et al. | |
| 5,648,768 A * | 7/1997 | Bouve .......................... | 340/988 |
| 6,216,086 B1 | 4/2001 | Seymour et al. | |
| 6,282,489 B1 | 8/2001 | Bellesfield et al. | |
| 6,591,188 B1 | 7/2003 | Ohler | |
| 6,611,754 B2 | 8/2003 | Klein | |
| 6,615,130 B2 | 9/2003 | Myr | |
| 6,622,084 B2 | 9/2003 | Cardno et al. | |
| 6,622,087 B2 | 9/2003 | Anderson | |
| 6,772,213 B2 | 8/2004 | Glorikian | |
| 6,865,476 B1 | 3/2005 | Jokerst, Sr. | |
| 6,973,384 B2 | 12/2005 | Zhao et al. | |

(Continued)

*Primary Examiner* — Tuan C. To
*Assistant Examiner* — Yuri Kan
(74) *Attorney, Agent, or Firm* — Sughrue Mion, PLLC

(57) ABSTRACT

To determine whether to notify a traveler of events proximate to a travel path, a description of an event and an event location are received. A geographic coordinate area search range is determined based on the received event location. All midpoints of multiple contiguous segments of the travel path that lie within the determined geographic coordinate search range are identified. A set of segments is determined based on the identified midpoints and proximity searched to identify one segment within the searched set of segments that is in closest proximity to the received event location. A closest offset event location along the identified one segment is identified used to determine whether the user is to be notified of the event.

23 Claims, 29 Drawing Sheets

(56) References Cited

U.S. PATENT DOCUMENTS

| | | |
|---|---|---|
| 7,007,228 B1 | 2/2006 | Carro |
| 7,082,365 B2 | 7/2006 | Sheha et al. |
| 7,263,664 B1 | 8/2007 | Daughtrey |
| 7,271,742 B2 | 9/2007 | Sheha et al. |
| 7,302,343 B2 | 11/2007 | Beatty |
| 7,411,493 B2 | 8/2008 | Smith |
| 7,565,239 B2 | 7/2009 | de Silva et al. |
| 7,617,042 B2 | 11/2009 | Horvitz et al. |
| 7,698,062 B1 | 4/2010 | McMullen et al. |
| 7,777,648 B2 | 8/2010 | Smith et al. |
| 7,822,426 B1 | 10/2010 | Wuersch |
| 7,822,546 B2 | 10/2010 | Lee |
| 7,835,859 B2 | 11/2010 | Bill |
| 7,903,029 B2 | 3/2011 | Dupray |
| 7,920,962 B2 | 4/2011 | D'Andrea et al. |
| 7,983,835 B2 | 7/2011 | Lagassey |
| 8,014,939 B2 | 9/2011 | Sheha et al. |
| 8,082,096 B2 | 12/2011 | Dupray |
| 8,566,026 B2 * | 10/2013 | Bouve ............ 701/411 |
| 2001/0029425 A1 | 10/2001 | Myr |
| 2002/0068585 A1 | 6/2002 | Chan et al. |
| 2002/0165665 A1 | 11/2002 | Kim |
| 2003/0036848 A1 | 2/2003 | Sheha et al. |
| 2003/0040946 A1 | 2/2003 | Sprenger et al. |
| 2003/0171870 A1 * | 9/2003 | Gueziec ............ 701/202 |
| 2004/0068364 A1 | 4/2004 | Zhao et al. |
| 2004/0198386 A1 | 10/2004 | Dupray |
| 2004/0230348 A1 | 11/2004 | Mann et al. |
| 2005/0023524 A1 * | 2/2005 | Beatty ............ 257/59 |
| 2005/0085998 A1 | 4/2005 | Bless et al. |
| 2006/0030983 A1 | 2/2006 | Bautista |
| 2006/0095199 A1 | 5/2006 | Lagassey |
| 2006/0148488 A1 | 7/2006 | Syrbe |
| 2006/0229807 A1 | 10/2006 | Sheha et al. |
| 2006/0265489 A1 | 11/2006 | Moore |
| 2007/0005240 A1 | 1/2007 | Oumi et al. |
| 2007/0061266 A1 * | 3/2007 | Moore et al. ............ 705/51 |
| 2007/0087756 A1 | 4/2007 | Hoffberg |
| 2007/0208503 A1 | 9/2007 | Harnsberger |
| 2007/0219706 A1 | 9/2007 | Sheynblat |
| 2007/0273558 A1 | 11/2007 | Smith et al. |
| 2007/0287473 A1 | 12/2007 | Dupray |
| 2008/0046169 A1 | 2/2008 | Beatty |
| 2008/0046174 A1 | 2/2008 | Johnson |
| 2008/0046298 A1 | 2/2008 | Ben-Yehuda et al. |
| 2008/0048890 A1 | 2/2008 | Sheha et al. |
| 2008/0051985 A1 | 2/2008 | D'Andrea et al. |
| 2008/0243564 A1 | 10/2008 | Busch et al. |
| 2008/0281518 A1 | 11/2008 | Dozier et al. |
| 2008/0294662 A1 | 11/2008 | Chen |
| 2009/0150062 A1 | 6/2009 | Han |
| 2009/0157307 A1 | 6/2009 | Krumm et al. |
| 2009/0157664 A1 | 6/2009 | Wen |
| 2009/0160676 A1 | 6/2009 | Stehle et al. |
| 2009/0276151 A1 | 11/2009 | Bucchieri |
| 2010/0088012 A1 | 4/2010 | O'Sullivan et al. |
| 2010/0118025 A1 | 5/2010 | Smith et al. |
| 2010/0235285 A1 | 9/2010 | Hoffberg |
| 2010/0248746 A1 * | 9/2010 | Saavedra et al. ............ 455/456.3 |
| 2010/0305842 A1 | 12/2010 | Feng |
| 2010/0317420 A1 | 12/2010 | Hoffberg |
| 2011/0004513 A1 | 1/2011 | Hoffberg |
| 2011/0021234 A1 | 1/2011 | Tibbitts et al. |
| 2011/0022304 A1 | 1/2011 | Lee |
| 2011/0043377 A1 | 2/2011 | McGrath et al. |
| 2011/0106429 A1 | 5/2011 | Poppen et al. |
| 2011/0143719 A1 | 6/2011 | Jung et al. |
| 2011/0160988 A1 | 6/2011 | Rogers |
| 2011/0169660 A1 | 7/2011 | Gueziec |
| 2011/0171950 A1 | 7/2011 | Ivanchikov |
| 2011/0184642 A1 | 7/2011 | Rotz et al. |
| 2011/0196601 A1 | 8/2011 | Miura et al. |
| 2011/0208417 A1 | 8/2011 | Fink et al. |
| 2011/0224892 A1 | 9/2011 | Speiser |
| 2011/0227724 A1 | 9/2011 | Zhao et al. |
| 2011/0273568 A1 | 11/2011 | Lagassey |
| 2011/0282573 A1 | 11/2011 | Ting |
| 2011/0300894 A1 * | 12/2011 | Roberts et al. ............ 455/521 |
| 2011/0320275 A1 | 12/2011 | O'Sullivan et al. |
| 2012/0089326 A1 | 4/2012 | Bouve |
| 2012/0184293 A1 | 7/2012 | Li et al. |

* cited by examiner

| | | | | | | | |
|---|---|---|---|---|---|---|---|
| L | 727 | 12 | LAT12 | LONG12 | L | 19 | 25 | MPLAT-L | MPLONG-L |
| M | 727 | 13 | LAT13 | LONG13 | M | 24 | 25 | MPLAT-M | MPLONG-M |
| N | 727 | 14 | LAT14 | LONG14 | N | 24 | 26 | MPLAT-N | MPLONG-N |
| O | 722 | 15 | LAT15 | LONG15 | O | 20 | 21 | MPLAT-O | MPLONG-O |
| P | 726 | 16 | LAT16 | LONG16 | P | 3 | 15 | MPLAT-P | MPLONG-P |
| Q | 724,725 | 17 | LAT17 | LONG17 | Q | 22 | 29 | MPLAT-Q | MPLONG-Q |
| R | 724,725,726 | 18 | LAT18 | LONG18 | R | 17 | 22 | MPLAT-R | MPLONG-R |
| S | 724,726 | 19 | LAT19 | LONG19 | S | 16 | 17 | MPLAT-S | MPLONG-S |
| T | 722 | 20 | LAT20 | LONG20 | T | 21 | 28 | MPLAT-T | MPLONG-T |
| U | 726 | 21 | LAT21 | LONG21 | U | 21 | 27 | MPLAT-U | MPLONG-U |
| V | 726 | 22 | LAT22 | LONG22 | V | 15 | 16 | MPLAT-V | MPLONG-V |
| W | 726 | 23 | LAT23 | LONG23 | W | 21 | 22 | MPLAT-W | MPLONG-W |
| X | 722,723 | 24 | LAT24 | LONG24 | X | 8 | 12 | MPLAT-X | MPLONG-X |
| Y | 723 | 25 | LAT25 | LONG25 | Y | 8 | 9 | MPLAT-Y | MPLONG-Y |
| Z | 723 | 26 | LAT26 | LONG26 | Z | 2 | 9 | MPLAT-Z | MPLONG-Z |
| AA | 724 | 27 | LAT27 | LONG27 | AA | 4 | 16 | MPLAT-AA | MPLONG-AA |
| BB | 725 | 28 | LAT28 | LONG28 | BB | 10 | 17 | MPLAT-BB | MPLONG-BB |
| CC | 725 | 29 | LAT29 | LONG29 | CC | 5 | 10 | MPLAT-CC | MPLONG-CC |

*Fig. 6 Continue*

| SEGMENT DRIVER TABLE 6642 | |
|---|---|
| SEGMENT | DRIVERS |
| A | 723 |
| B | 723 |
| C | 723 |
| D | 722,723,727 |
| E | 727 |
| F | 727 |
| G | 722 |
| H | 722 |
| I | 727 |
| J | 722 |
| K | 722,727 |
| L | 727 |
| M | 727 |
| N | 727 |
| O | 722 |
| P | 726 |
| Q | 724,725 |
| R | 724,725,726 |
| S | 724,726 |
| T | 722 |
| U | 726 |
| V | 726 |
| W | 726 |
| X | 722,723 |
| Y | 723 |
| Z | 723 |
| AA | 724 |
| BB | 725 |
| CC | 725 |

| ROUTE TABLE 6641 | | | | | | | | | | | | |
|---|---|---|---|---|---|---|---|---|---|---|---|---|
| DRIVER ID | CONTACT | EVENT PREFERENCE CATEGORY | | | ROUTE SEGMENT PATH SEQUENCE | | | | | | | |
| | | Hotel Discount $ | Road Emergencies | Scenic Views | | | | | | | | |
| 722 | 312-555-4321 | 1 | 1 | 1 | G | H | X | D | K | J | O | T |
| 723 | 312-555-5562 | 1 | 1 | 0 | Z | Y | X | D | C | B | A | |
| 724 | 312-555-7854 | 0 | 1 | 1 | AA | S | R | Q | | | | |
| 725 | 312-555-0266 | 1 | 1 | 1 | CC | BB | R | Q | | | | |
| 726 | 312-555-4933 | 0 | 1 | 1 | U | W | R | S | V | P | | |
| 727 | 312-555-7344 | 1 | 1 | 0 | N | M | L | K | D | E | F | I |

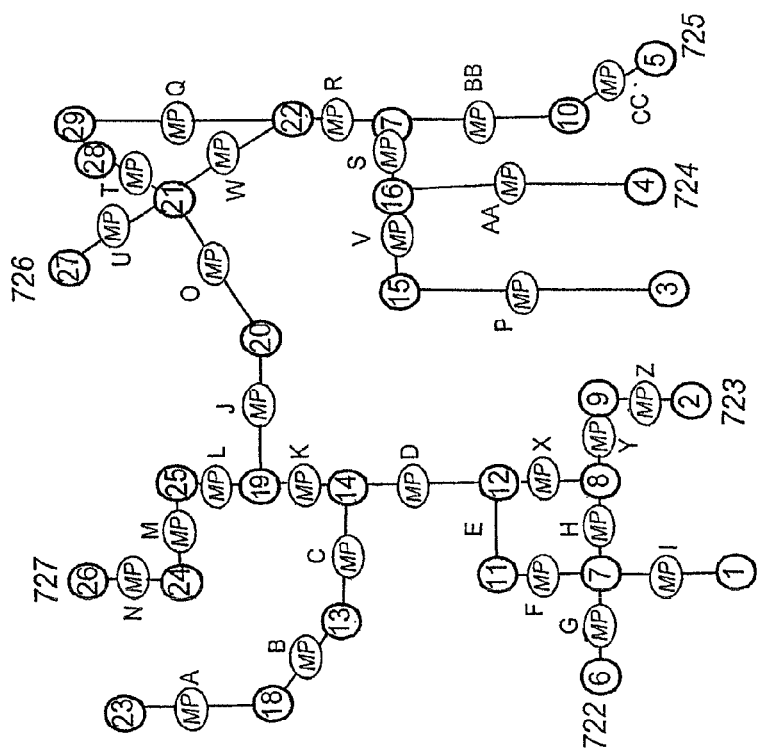

| SEGMENT MIDPOINT TABLE 6644 | | | | |
|---|---|---|---|---|
| SEGMENT | ANODE | BNODE | MIDPOINT LATITUDE | MIDPOINT LONGITUDE |
| A | 18 | 23 | MPLAT-A | MPLONG-A |
| B | 13 | 18 | MPLAT-B | MPLONG-B |
| C | 13 | 14 | MPLAT-C | MPLONG-C |
| D | 12 | 14 | MPLAT-D | MPLONG-D |
| E | 11 | 12 | MPLAT-E | MPLONG-E |
| F | 7 | 11 | MPLAT-F | MPLONG-F |
| G | 6 | 7 | MPLAT-G | MPLONG-G |
| H | 7 | 8 | MPLAT-H | MPLONG-H |
| I | 1 | 7 | MPLAT-I | MPLONG-I |
| J | 19 | 20 | MPLAT-J | MPLONG-J |
| K | 14 | 19 | MPLAT-K | MPLONG-K |
| L | 19 | 25 | MPLAT-L | MPLONG-L |
| M | 24 | 25 | MPLAT-M | MPLONG-M |
| N | 24 | 26 | MPLAT-N | MPLONG-N |
| O | 20 | 21 | MPLAT-O | MPLONG-O |
| P | 3 | 15 | MPLAT-P | MPLONG-P |
| Q | 22 | 29 | MPLAT-Q | MPLONG-Q |
| R | 17 | 22 | MPLAT-R | MPLONG-R |
| S | 16 | 17 | MPLAT-S | MPLONG-S |
| T | 21 | 28 | MPLAT-T | MPLONG-T |
| U | 21 | 27 | MPLAT-U | MPLONG-U |
| V | 15 | 16 | MPLAT-V | MPLONG-V |
| W | 21 | 22 | MPLAT-W | MPLONG-W |
| X | 8 | 12 | MPLAT-X | MPLONG-X |
| Y | 8 | 9 | MPLAT-Y | MPLONG-Y |
| Z | 2 | 9 | MPLAT-Z | MPLONG-Z |
| AA | 4 | 16 | MPLAT-AA | MPLONG-AA |
| BB | 10 | 17 | MPLAT-BB | MPLONG-BB |
| CC | 5 | 10 | MPLAT-CC | MPLONG-CC |

*Fig. 13c*

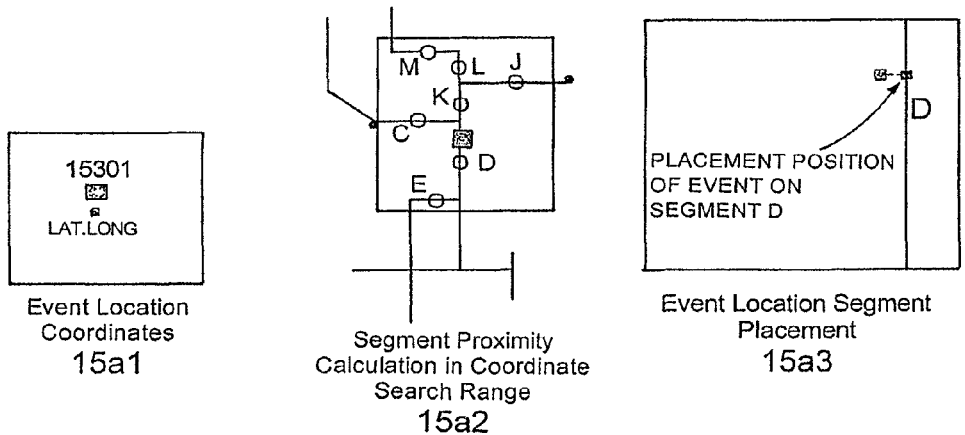

| SEGMENT MIDPOINT TABLE 6644 | | | | |
|---|---|---|---|---|
| SEGMENT | ANODE | BNODE | MIDPOINT LATITUDE | MIDPOINT LONGITUDE |
| A | 18 | 23 | MPLAT-A | MPLONG-A |
| B | 13 | 18 | MPLAT-B | MPLONG-B |
| C | 13 | 14 | MPLAT-C | MPLONG-C |
| D | 12 | 14 | MPLAT-D | MPLONG-D |
| E | 11 | 12 | MPLAT-E | MPLONG-E |
| F | 7 | 11 | MPLAT-F | MPLONG-F |
| G | 6 | 7 | MPLAT-G | MPLONG-G |
| H | 7 | 8 | MPLAT-H | MPLONG-H |
| I | 1 | 7 | MPLAT-I | MPLONG-I |
| J | 19 | 20 | MPLAT-J | MPLONG-J |
| K | 14 | 19 | MPLAT-K | MPLONG-K |
| L | 19 | 25 | MPLAT-L | MPLONG-L |
| M | 24 | 25 | MPLAT-M | MPLONG-M |
| N | 24 | 26 | MPLAT-N | MPLONG-N |
| O | 20 | 21 | MPLAT-O | MPLONG-O |
| P | 3 | 15 | MPLAT-P | MPLONG-P |
| Q | 22 | 29 | MPLAT-Q | MPLONG-Q |
| R | 17 | 22 | MPLAT-R | MPLONG-R |
| S | 16 | 17 | MPLAT-S | MPLONG-S |
| T | 21 | 28 | MPLAT-T | MPLONG-T |
| U | 21 | 27 | MPLAT-U | MPLONG-U |
| V | 15 | 16 | MPLAT-V | MPLONG-V |
| W | 21 | 22 | MPLAT-W | MPLONG-W |
| X | 8 | 12 | MPLAT-X | MPLONG-X |
| Y | 8 | 9 | MPLAT-Y | MPLONG-Y |
| Z | 2 | 9 | MPLAT-Z | MPLONG-Z |
| AA | 4 | 16 | MPLAT-AA | MPLONG-AA |
| BB | 10 | 17 | MPLAT-BB | MPLONG-BB |
| CC | 5 | 10 | MPLAT-CC | MPLONG-CC |

| NODE COORDINATE TABLE 6643 | | |
|---|---|---|
| NODE | LATITUDE | LONGITUDE |
| 1 | LAT1 | LONG1 |
| 2 | LAT2 | LONG2 |
| 3 | LAT3 | LONG3 |
| 4 | LAT4 | LONG4 |
| 5 | LAT5 | LONG5 |
| 6 | LAT6 | LONG6 |
| 7 | LAT7 | LONG7 |
| 8 | LAT8 | LONG8 |
| 9 | LAT9 | LONG9 |
| 10 | LAT10 | LONG10 |
| 11 | LAT11 | LONG11 |
| 12 | LAT12 | LONG12 |
| 13 | LAT13 | LONG13 |
| 14 | LAT14 | LONG14 |
| 15 | LAT15 | LONG15 |
| 16 | LAT16 | LONG16 |
| 17 | LAT17 | LONG17 |
| 18 | LAT18 | LONG18 |
| 19 | LAT19 | LONG19 |
| 20 | LAT20 | LONG20 |
| 21 | LAT21 | LONG21 |
| 22 | LAT22 | LONG22 |
| 23 | LAT23 | LONG23 |
| 24 | LAT24 | LONG24 |
| 25 | LAT25 | LONG25 |
| 26 | LAT26 | LONG26 |
| 27 | LAT27 | LONG27 |
| 28 | LAT28 | LONG28 |
| 29 | LAT29 | LONG29 |

*Fig. 15a*

ROUTE TABLE 6641

| DRIVER ID | CONTACT | EVENT PREFERENCE CATEGORY | | | ROUTE SEGMENT PATH SEQUENCE | | | | | | |
|---|---|---|---|---|---|---|---|---|---|---|---|
| | | Hotel Discount $ | Road Emergencies | Scenic Views | | | | | | | |
| 722 | 312-555-4321 | 1 | 1 | 1 | G | H | X | D | K | J | O | T |
| 723 | 312-555-5562 | 1 | 1 | 0 | Z | Y | X | D | C | B | A | |
| 724 | 312-555-7854 | 0 | 1 | 1 | AA | S | R | Q | | | | |
| 725 | 312-555-0266 | 1 | 1 | 1 | CC | BB | R | Q | | | | |
| 726 | 312-555-4933 | 0 | 1 | 1 | U | W | R | S | V | P | | |
| 727 | 312-555-7344 | 1 | 1 | 0 | N | M | L | K | D | E | F | I |

SEGMENT DRIVER TABLE 6642

| SEGMENT | DRIVERS |
|---|---|
| A | 723 |
| B | 723 |
| C | 723 |
| D | 722,723,727 |
| E | 727 |
| F | 727 |
| G | 722 |
| H | 722 |
| I | 727 |
| J | 722 |
| K | 722,727 |
| L | 727 |
| M | 727 |
| N | 727 |
| O | 722 |
| P | 726 |
| Q | 724,725 |
| R | 724,725,726 |
| S | 724,726 |
| T | 722 |
| U | 726 |
| V | 726 |
| W | 726 |
| X | 722,723 |
| Y | 723 |
| Z | 723 |
| AA | 724 |
| BB | 725 |
| CC | 725 |

15b1

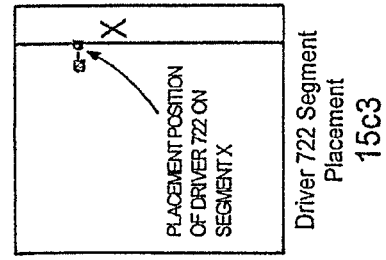

Driver 722 Segment Placement
15c3

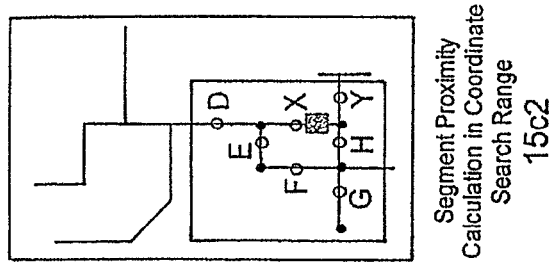

Segment Proximity Calculation in Coordinate Search Range
15c2

Fig. 15c

| NODE COORDINATE TABLE 6643 | | |
|---|---|---|
| NODE | LATITUDE | LONGITUDE |
| 1 | LAT1 | LONG1 |
| 2 | LAT2 | LONG2 |
| 3 | LAT3 | LONG3 |
| 4 | LAT4 | LONG4 |
| 5 | LAT5 | LONG5 |
| 6 | LAT6 | LONG6 |
| 7 | LAT7 | LONG7 |
| 8 | LAT8 | LONG8 |
| 9 | LAT9 | LONG9 |
| 10 | LAT10 | LONG10 |
| 11 | LAT11 | LONG11 |
| 12 | LAT12 | LONG12 |
| 13 | LAT13 | LONG13 |
| 14 | LAT14 | LONG14 |
| 15 | LAT15 | LONG15 |
| 16 | LAT16 | LONG16 |
| 17 | LAT17 | LONG17 |
| 18 | LAT18 | LONG18 |
| 19 | LAT19 | LONG19 |
| 20 | LAT20 | LONG20 |
| 21 | LAT21 | LONG21 |
| 22 | LAT22 | LONG22 |
| 23 | LAT23 | LONG23 |
| 24 | LAT24 | LONG24 |
| 25 | LAT25 | LONG25 |
| 26 | LAT26 | LONG26 |
| 27 | LAT27 | LONG27 |
| 28 | LAT28 | LONG28 |
| 29 | LAT29 | LONG29 |

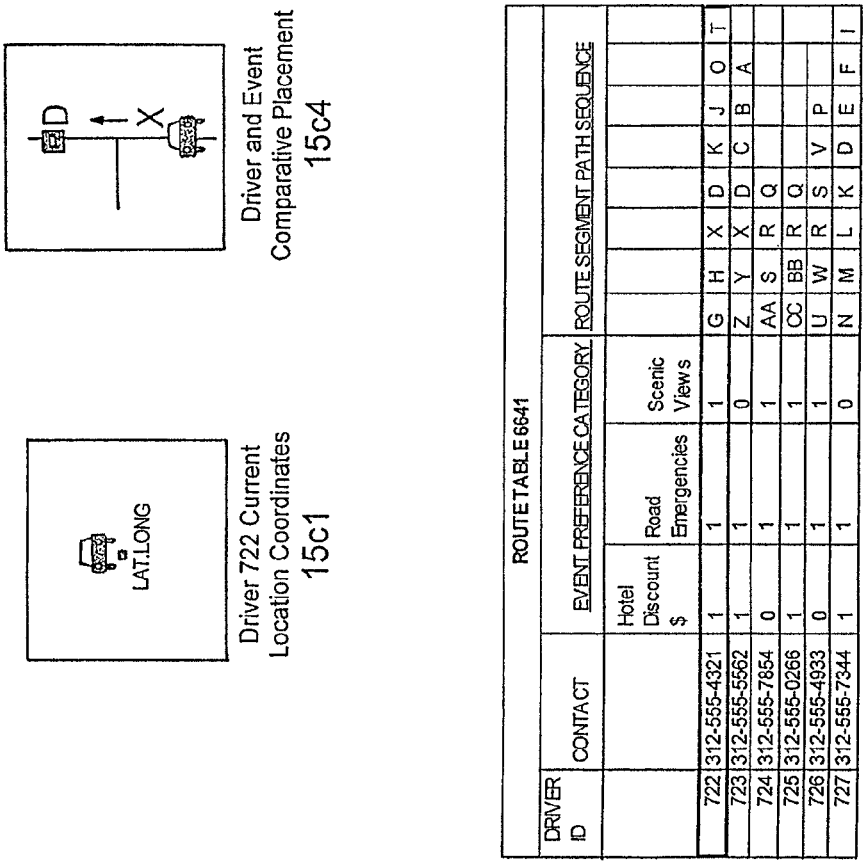
Fig. 15c Continue

SELECTED DRIVER NOTIFICATION OF TRANSITORY ROADTRIP EVENTS

RELATED APPLICATION

The present application is a continuation of U.S. application Ser. No. 12/900,736, filed Oct. 8, 2010 and entitled "SELECTED DRIVER NOTIFICATION OF TRANSITORY ROADTRIP EVENTS", the contents of which are hereby incorporated by reference into this application.

FIELD OF THE INVENTION

The present Invention is related generally to information technology and more particularly to a technique for generating trip routing for travelers and informing travelers, such as highway drivers, of transitory commercial, emergency, recreational and/or other events that occur along their trip routes.

BACKGROUND OF THE INVENTION

For decades, information concerning enroute events, most commonly traffic congestion, has been provided by radio station announcements to drivers as well as other listeners in the broadcast vicinity. The traffic information consisted primarily of events that could impact drivers, such as traffic congestion and accidents. Typically, the event location, such as road name and intersection, would be included so that those driving or considering driving along the affected road would be informed and have the option of changing their driving plans. The radio station would receive information about traffic jams and accidents, from traffic reporting helicopters that overfly the roads, and recently, also from reports by drivers themselves who observe traffic events first-hand and report same to the radio station via cell phone. With the advent of Global Positioning System (GPS) navigation and smartphone technology, the available traffic information has become more accurate, useful and varied.

One proposed methodology for utilizing these new technologies includes an in-vehicle device which determines both the location of the vehicle and the road on which the vehicle is located. Such device also receives road-specific event information from a centralized service. The in-vehicle device then filters the road-specific information and determines the relevance of the information for the driver based on current vehicle road location and/or vicinity. What a driver receives, however, includes event information which would not necessarily be relevant or useful to that driver. This would be the case where a driver's planned driving route veers off to another road prior to where the event was reported to be located on the current road. As a result, information about this event would not only be meaningless but potentially misleading and confusing to certain drivers.

Another proposed methodology provides a means for reporting an event based upon the GPS position of the reporting mobile units. Event information (i.e. locations and descriptions) is transmitted from the mobile units to a centralized system. The centralized system stores said event information and makes such information available to vehicle drivers through various forms of textual and graphic displays, including event placement on electronic road maps. This methodology requires each driver to examine the location of the event on a map, as well as examine the subject matter, in conjunction with the knowledge of the planned route to determine if the event is located along each driver's actual route, and thus whether or not the information is relevant and useful.

Yet another proposed methodology allows users to create a highway driving trip plan that includes enroute events and activities by accessing a proprietary database of stored events and activity sites that are located along specified routes. Those items can be displayed in electronic map format. The user can personalize the trip plan by having only preferred items displayed and can cause those items to be rearranged and resequenced for presentation in a desired order. The user can enhance the information by assigning visiting times to each selected item, so that an entire itinerary can be created. However, the user must select the events and site information from a database during creation of the trip route; while the user is driving on the trip there is no capability to acquire, let alone notify drivers of short-term events that occur spontaneously ahead along specific routes.

Still another proposed methodology allows users to create trip plans including map displays by accessing a centralized system. These trip plan maps, with user-created event location icons and symbols, can be shared with other users. Thus, all users are able to create highway trip plans and make use of event and activity information provided by other users that are located along a specified route. However, each user must discern from the information received, whether the event is on a particular user's intended route path and whether the event is of an activity that is of particular interest.

While all the above described methodologies may provide helpful assistance to travelers, each suffers from various deficiencies. For example, none of the proposed methodologies is capable of consistently providing relevant and useful information to a driver in a timely and efficient manner. Accordingly, it is an objective of the present Invention to provide improvements beyond those found in the previously proposed methodologies. It is another objective of the present Invention to provide a technique for generating, storing and processing trip route data records. It is yet another object of the present Invention to provide an improved technique for notifying travelers of transitory events along their travel path. It is still another object of the present Invention to provide an improved technique which facilitates the consistent delivery of relevant and useful information to a driver in a timely and efficient manner.

SUMMARY OF INVENTION

In accordance with aspects of the present invention a system for generating travel route data includes a modem, which preferably forms part of a transceiver, a processor, such as a personal computer or server processor, and a database.

The modem is configured to receive (i) first user route parameter data from a first user, (ii) second user route parameter data from a second user, and (iii) third user route parameter data from a third user. Preferably, the modem is configured such that it is capable of receiving the route parameter data via the Internet. The users are typically individuals intending to take a trip. The users could, for example, be drivers planning a road trip in an automobile. Thus, users are sometimes referred to as drivers, but could be virtually any type of traveler, e.g. a train or plane traveler, or could be someone acting on behalf of a traveler. The user route parameter data for each respective user includes a start location and end location for future travel.

The processor is configured with logic, typically in the form of instructions stored on a storage media, e.g. a memory, but could be in the form of hardware or firmware. This logic causes the processor to function so as to generate (i) first user route data based on the received first user route parameter data, (ii) second user route data based on said received second user route parameter data, and (iii) third user route data based on said received third user route parameter data.

The generated first user route data includes first geographic coordinate data with imbedded strings of first geographic coordinate identifiers corresponding to strings of first geographic coordinates defining a travel path between the start and end locations included in the first user route parameter data. The generated second user route data includes second geographic coordinate data with imbedded strings of second geographic coordinate identifiers corresponding to strings of second geographic coordinates defining a travel path between the start and end locations included in the second user route parameter data. The generated third user route data includes third geographic coordinate data with imbedded strings of third geographic coordinate identifiers corresponding to strings of third geographic coordinates defining a travel path between the start and end locations included in the third user route parameter data. It should be understood that data tables can be, and preferably are, assembled so as construct an "imbedded geographic coordinate string" based on the imbedded string of geographic coordinate identifiers for the required functionality. Although the imbedded strings of geographic coordinate identifiers corresponding to strings of geographic coordinates could be the strings of geographic coordinates themselves, preferably there is not a stand alone record that contains all the coordinate strings for a route, since this would require much more data storage without an offsetting gain of functionality or efficiency.

The database is configured to store (i) the generated first route data in association with an identifier of the first user and contact information for contacting the first user while in route, (ii) the generated second route data in association with an identifier of the second user and contact information for contacting the second user in route, and (iii) the generated third route data in association with an identifier of the third user and contact information for contacting the third user while traveling.

Preferably, the modem is also configured to receive reported event data, including a description of an event and an event location. The event may be related to a commercial offering, sightseeing, recreation, an emergency, weather, traffic or construction. If reported event data is received, the processor is further configured to compare geographic coordinates corresponding to the received event location with the strings of geographic coordinates corresponding to the stored imbedded strings of geographic coordinate identifiers of the first user route data, the second user route data, and the third user route data. The processor then determines, based on the coordinate comparison, if (i) the stored first user route data corresponds to the received event location, (ii) the stored second user route data corresponds to the received event location, and (iii) the stored third user route data corresponds to the received event location.

For example, the user route data may be determined to correspond to the received event location if the stored applicable user route data includes geographic coordinates that match the geographic coordinates corresponding to the received event location. Most preferably, the user route data is determined to correspond to the received event location if the strings of geographic coordinates corresponding to the stored imbedded strings of the applicable geographic coordinate identifiers include geographic coordinates within a predefined proximity to the geographic coordinates corresponding to the received event location. The predefined proximity could, for example, be a single distance set by the processor, a distance set by the processor based on the type of event reported in the event data, a distance selected by the user or some other predefined distance.

The processor next directs the modem to transmit a message regarding the event (i) to the first user based on the stored contact information for contacting the first user only if it is determined that said stored first user route data corresponds to said received event location, (ii) to the second user based on the stored contact information for contacting the second user only if it is determined that said stored second user route data corresponds to said received event location, and (iii) to the third user based on the stored contact information for contacting the third user only if it is determined that said stored third user route data corresponds to the received event location.

According to other preferred aspects of the invention, the received event location is defined by other than geographic coordinates, e.g. a street address or a route and mile number. If so, the processor is further configured to determine the geographic coordinates corresponding to the received event location, and the comparing of geographic coordinates is performed using the determined geographic coordinates corresponding to the received event location.

In accordance with still other preferred aspects of the invention, the processor may be further configured to also compare the geographic coordinates corresponding to the received event location with geographic coordinates representing a current location of each of the first, second and third users, but only if it has been determined that the stored user route data for the applicable user corresponds to the received event location. If the comparison with the geographic coordinates representing a current location of the applicable user has been performed, the processor also determines, based on that comparison, if that user has not traveled along the travel path defined by the stored route data for that user, beyond the received event location. Accordingly, the message regarding the event is transmitted (i) to the first user only if it is also determined that the first user has not traveled along the travel path defined by the stored first user route data beyond the received event location, (ii) to the second user only if it is also determined that the second user has not traveled along the travel path defined by the stored second user route data beyond the received event location, and (iii) to the third user only if it is determined that the third user has not traveled along the travel path defined by the stored third user route data beyond the received event location.

For example, if only the stored first user route data and the stored second user route data are determined to correspond to the received event location, the message regarding the event is transmitted only to the first user and the second user, and not to the third user. In such a case, the modem is further configured to receive from the first user, in response to the transmitted message regarding the event, current travel location data, representing a current location of the first user along the travel path defined by the stored first user route data, and to receive from the second user, in response to the transmitted message regarding the event, current travel location data, representing a current location of the second user along the travel path defined by the stored second user route data. The processor is further configured to compare the geographic coordinates corresponding to the received event location with geographic coordinates corresponding to the received first user current travel location data and to the received second user current travel location data. The processor determines, based on the comparison with the geographic coordinates corresponding to the received first user current travel location data, if the first user has not traveled along the travel path defined by the stored first user route data beyond the received event location.

The processor also determines, based on the comparison with the geographic coordinates corresponding to the received second user current travel location data, if the second user has not traveled along the travel path defined by the stored second user route data beyond the received event location. Finally, the processor directs the modem to transmit another message, including a notification of the event, to the first user based on the stored contact information for contacting the first user only if it is determined that the first user has not traveled beyond the received event location, and to transmit another message, including a notification of the event to the second user based on the stored contact information for contacting the second user only if it is determined that the second user has not traveled beyond the received event location.

BRIEF DESCRIPTION OF THE DRAWINGS

FIG. 13c illustrates the route configuration data that emanates from the Route, Segment Driver, Node Coordinate and Segment Midpoint Tables within the Route-Driver Database in accordance with the present Invention.

FIG. 15a illustrates the process by which an event report location is placed on the closest route segment using Route-Driver Database tables in accordance with the present Invention.

FIG. 15c illustrates the process by which an alerted driver location is placed on the closest route segment using Route-Driver Database tables in accordance with the present Invention.

DETAILED DESCRIPTION OF PREFERRED EMBODIMENTS OF THE INVENTION

Overview

Figure 1:
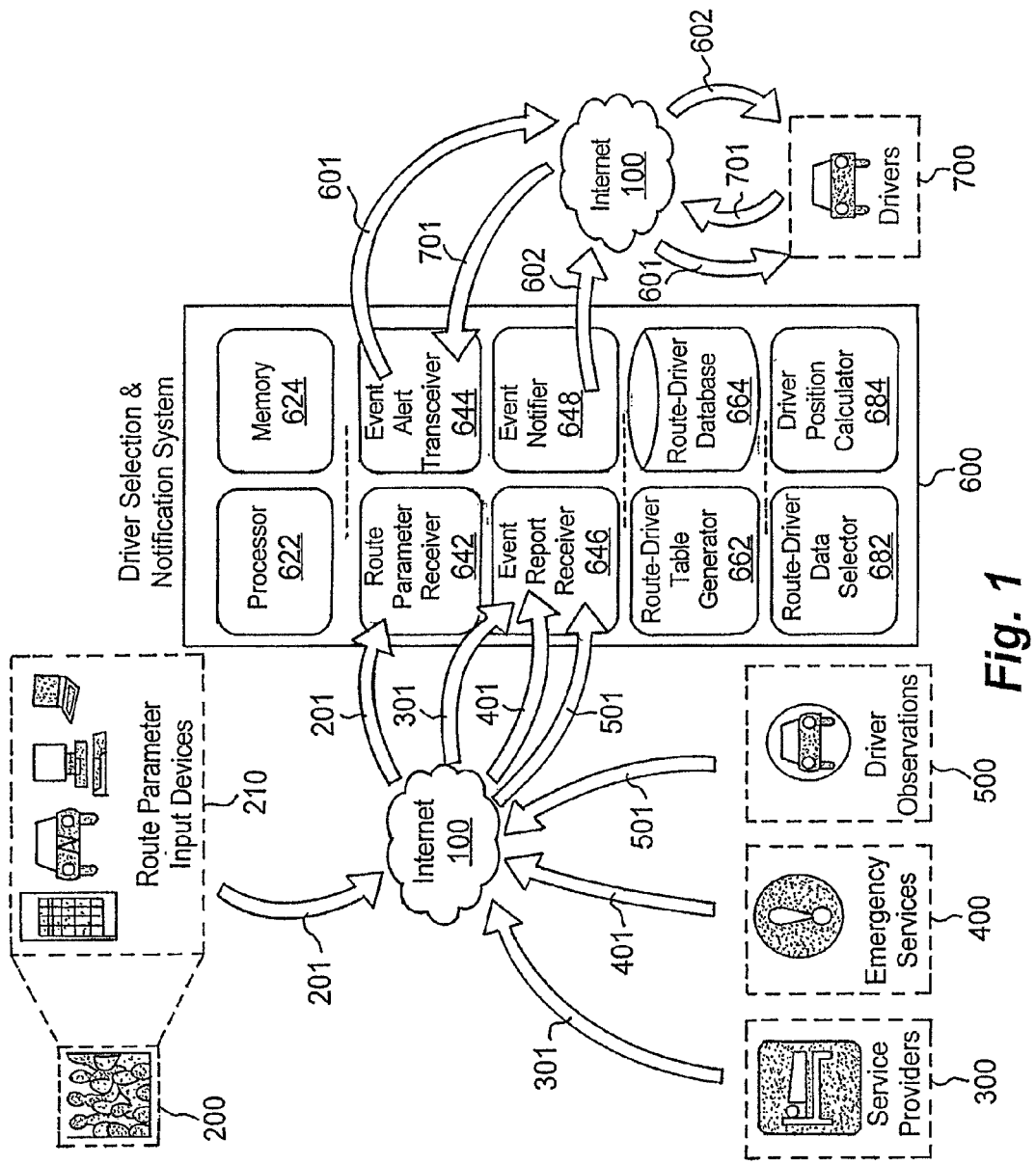
FIG. 1 is a high-level data flow diagram of the Driver Selection & Notification System (DSNS), including major input/output elements, in accordance with the present Invention.

The present Invention includes a receiving device, such as a modem, for receiving route parameter information (origination, destination, driver information, such as cell phone number, and trip preferences) a route table generator, typically logic in the form of software stored on memory and executed by a processing unit, that is configured for generating, based on the received route parameter information, a set of route-driver data tables, namely: (1) route segment strings with driver identification, trip preference and contact information, (2) segments and drivers who use those segments, (3) segment node geographic coordinate values, and (4) segments with nodes and midpoint geographic coordinate values, and a route-driver database storage device for storing said route-driver data tables.

The present Invention may also include a receiving device, such as the same or a different modem, for receiving event information, such as commercial travel offerings, emergency situation information, and observations from fellow drivers or others. Said event information includes geographic location information (e.g. geographic coordinates or address or route and mile point) and event description information and, optionally, event category information.

Logic, executable by the same or a different processing unit, configured for assembling said event information, and route-driver data search logic, also executable by the same or a different processing unit, that is configured for searching and calculating the geographic route segment location of said event and said event category information and comparing said event route segment location with said route segment strings of drivers by searching and selecting, if any, said route-driver data and said driver interest category in said route-driver database.

According to one embodiment of the Invention, logic is provided to extract said driver identification from said selected route-driver data and to direct transmission of alert message information by an event alert device, which may be the same or another modem, to selected drivers from said selected route-driver data. The event alert device also receives responses to the transmitted event alerts from said selected drivers.

The received driver responses from said selected drivers include current driver GPS geographic coordinates. Driver route segment location calculator logic, which may be executable by the same or a different processing unit, determines the driver's current geographic location from said driver GPS geographic coordinates, and determines driver route segment location in relation to the said event route segment location.

A transmitting device, which may be the same or a different modem, is directed by the driver position calculator logic, to notify said identified drivers of said event information if the said driver current route segment locations are prior to and within practical distance to said event route segment location. The practical distance (e.g. 300 feet, 3, 30, 300, 3000 miles, etc., depending on the nature of the event) may be a single predefined value, or determined by the logic based on the applicable event information, or selected by the driver.

According to another embodiment of the Invention, the location of the vehicle may optionally be monitored continuously by a centralized highway navigation system, so that time and distance to an enroute event can be continuously updated, so that event alerts that determine driver current geographic location would not be required.

It should be understood that there may be multiple sources of information about an enroute event, in which case a plurality of information data is received based on different event criteria.

It should also be understood that enroute information about multiple events may be provided based on information data received based on different criteria.

It should also be understood that the usefulness of the Invention is applicable to other travelers aside from vehicle drivers.

First Embodiment

The present Invention is described in the context of preferred apparatus, method and software that improve both the relevancy and usefulness to the driver of reported event information by confining the dissemination of such information to drivers whose routes take them directly past, or in close proximity to, the reported event, by limiting information only to that which is of interest to the driver, and also improving the timeliness and efficiency of the delivery of this information.

Although the embodiments herein are illustrated and described with respect to "smartphone" and GPS technology, the Invention is applicable to other appropriate existing and future technologies.

FIG. 1 is a high-level functional diagram depicting the Driver Selection & Notification System (DSNS) 600 and its interaction, facilitated by Internet 100, with Highway Trip Planners 200 using input devices 210 by which user route parameter data 201 is prepared and sent to said DSNS 600, Service Providers 300 sending event reports 301 to said DSNS 600, Emergency Services 400 sending event reports 401 to said DSNS 600, Driver Observations 500 sending event reports 501 to said DSNS 600, and Drivers 700 receiving event report alerts 601 from said DSNS 600, sending responses 701 to said DSNS 600, and receiving event notifications 602 from said DSNS 600.

Figure 2:
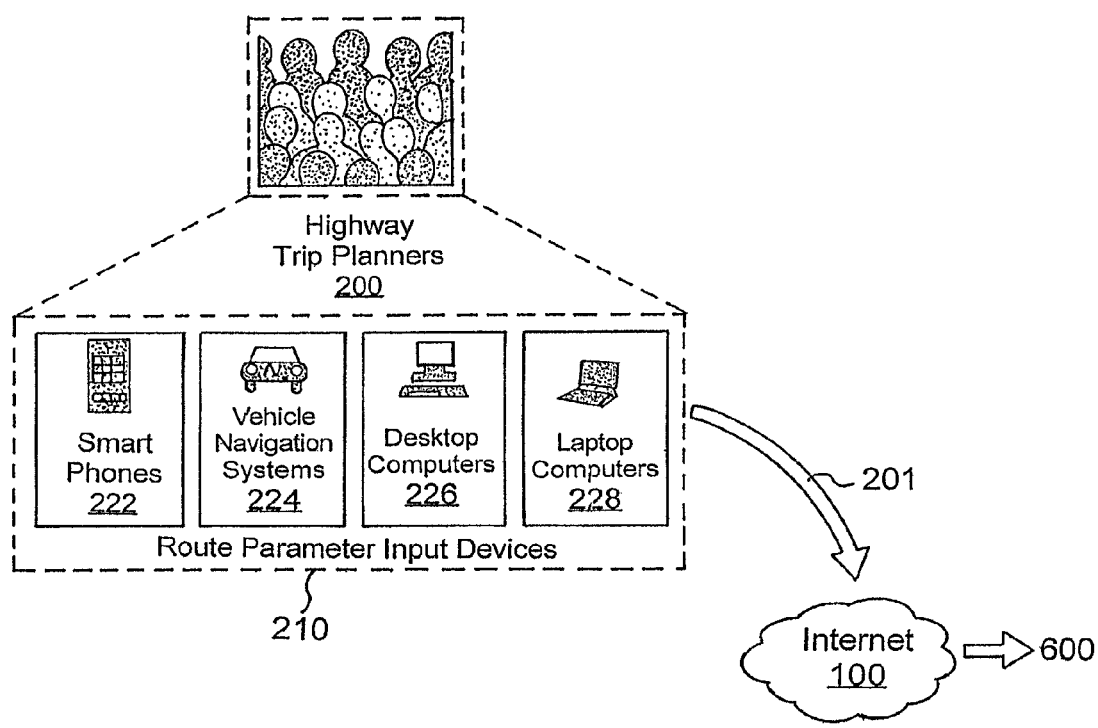
FIG. 2 displays the data flow from different types of input devices that highway trip planners use to create route parameters (origination, destination, trip preferences, etc) that are then transmitted to the DSNS for producing highway driving routes.

FIG. 2 illustrates said Highway Trip Planners 200 using said input devices 210, such as smartphone devices 222, vehicle navigation system devices 224, desktop computer devices 226 and laptop computer devices 228 to send said route parameter data 201 to said DSNS 600 via said Internet 100. Said route parameter data 201 includes, at a minimum, trip origin, destination, driver interest category and driver contact information.

Figure 3:
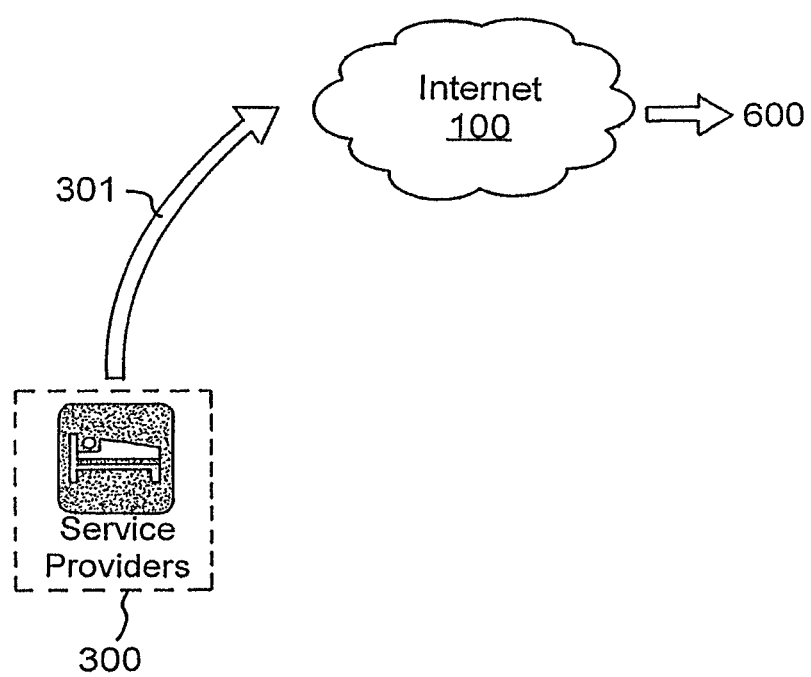
FIG. 3 illustrates the data flow from service providers (hotels, restaurants, retail shops, etc.) who send event reports (commercial offerings) to the DSNS to be processed and transmitted only to selected drivers, i.e. those drivers whose route, interests and timing are germane to the information.

FIG. 3 describes said event reports 301 created by said Service Providers 300, such as hotels, restaurants and shopping facilities. Said Service Providers 300 send said event reports 301 to said DSNS 600 via said Internet 100. The information of said event reports 301 would include geographic coordinates or address, as well as commercial offerings for selected route drivers, such as special advertisements or promotion.

Figure 4:
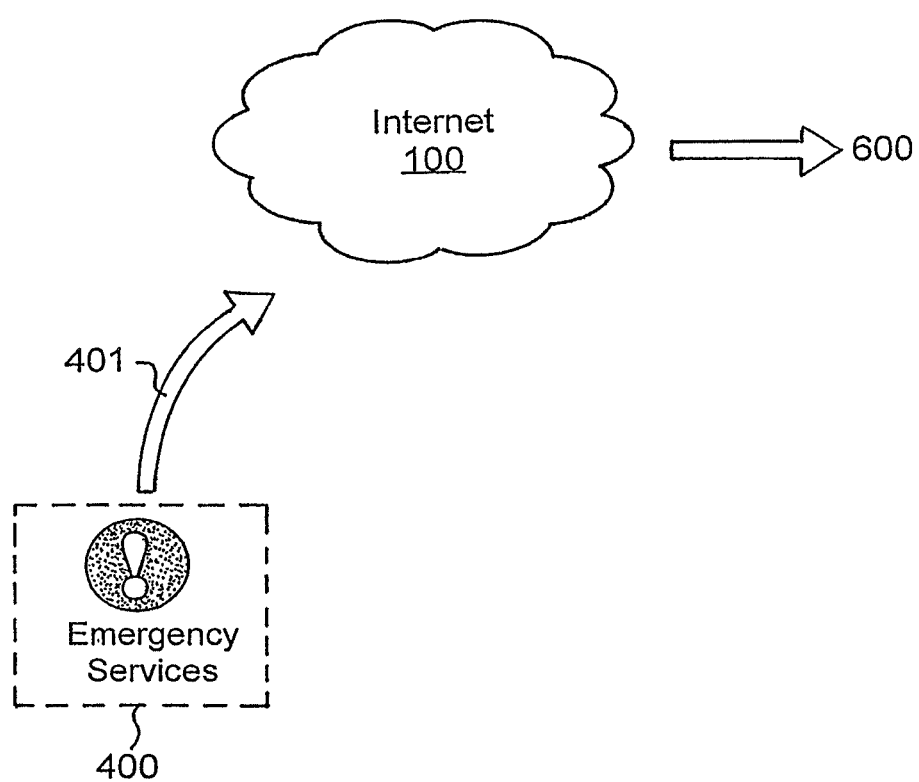
FIG. 4 illustrates the data flow of emergency reports (traffic accidents, road obstructions, etc.) that are sent to the DSNS to be processed and transmitted to selected drivers.

FIG. 4 describes said event reports 401 created by said Emergency Services 400, such as police, highway department and radio/television facilities. Said Emergency Services 400 send said event reports 401 to said DSNS 600 via said Internet 100. The information of said event reports 401 would include geographic coordinates or address, as well as information affecting road travel, such as traffic accidents and road conditions.

Figure 5:
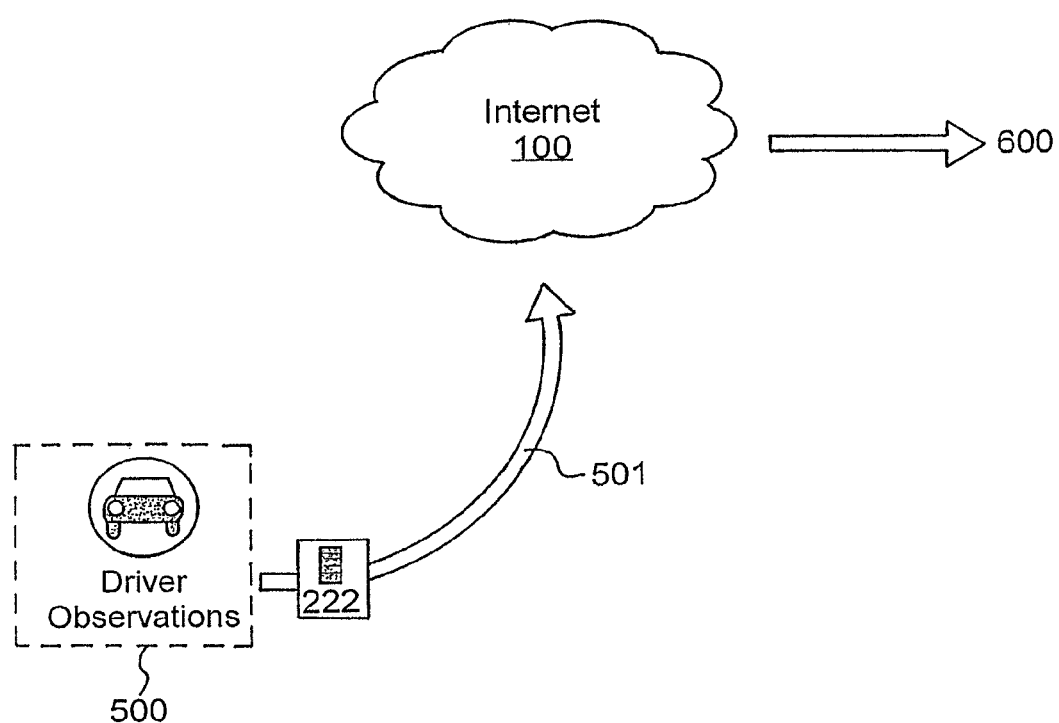
FIG. 5 illustrates the data flow from drivers who use smartphones to send event reports (observations) to the DSNS for processing and transmission to selected drivers.

FIG. 5 describes said event reports 501 created by said Driver Observations 500 using mobile devices, such as smartphone technology. Said Driver Observations 500 send said event reports 501 to said DSNS 600 via said Internet 100. The information of said event reports 501 would include geographic coordinates, as well as information of interest, such as a panoramic site, a memorable café or antique buys.

Referring again to the various components of said DSNS 600 shown in FIG. 1, as noted above, all logic elements operate in conjunction with Processor 622 and Memory 624. Route Parameter Receiver 642 receives said route parameter data 201 from said Highway Trip Planners 200 via said input devices 210. Event Report Receiver device 646 receives said event report data 301, 401 and 501 from said event report sources 300, 400 and 500. Event Alert Transceiver device 644 sends said event alert data 601 to said Drivers 700 and receives said response data 701 from said Drivers 700. Event Notifier logic 648 directs said event notification data 602 to said Drivers 700. Route-Driver Table Generator logic 662 creates Route-Driver data tables, that include route segment strings, segment and node geographic coordinate latitude and longitude values, and driver identification and interest information, including driver contact information such as a smartphone address, based on said route parameter data 201, and stores the Route-Driver data in Route-Driver Database 664. Route-Driver Data Selector logic 682 selects said Route-Driver data and assembles the geographic coordinate location corresponding to the received event report, i.e. the received event location, data 301, 401 and 501, and identifies drivers whose routes include segments where events are located. Driver Position Calculator logic 684 calculates selected driver route segment position within said selected Route-Driver data from said response data 701 and identifies those drivers associated with the previously selected Route-Driver data who are correctly positioned to find the applicable event notification data relevant and useful. That is, the Driver Position Calculator identifies only those of the originally selected drivers who have not already passed the location associated with the event beyond a practical distance, or who are too far behind the event for the event information to be useful given the interest category, or who are not otherwise currently positioned, e.g. because the driver has diverted from the original trip routing, such that the event information is irrelevant. The Event Notifier device 648, which may be the same or a different modem, is directed by the Driver Position Calculator 684 to transmit the event notification data 602 to only the identified drivers.

Figure 6:
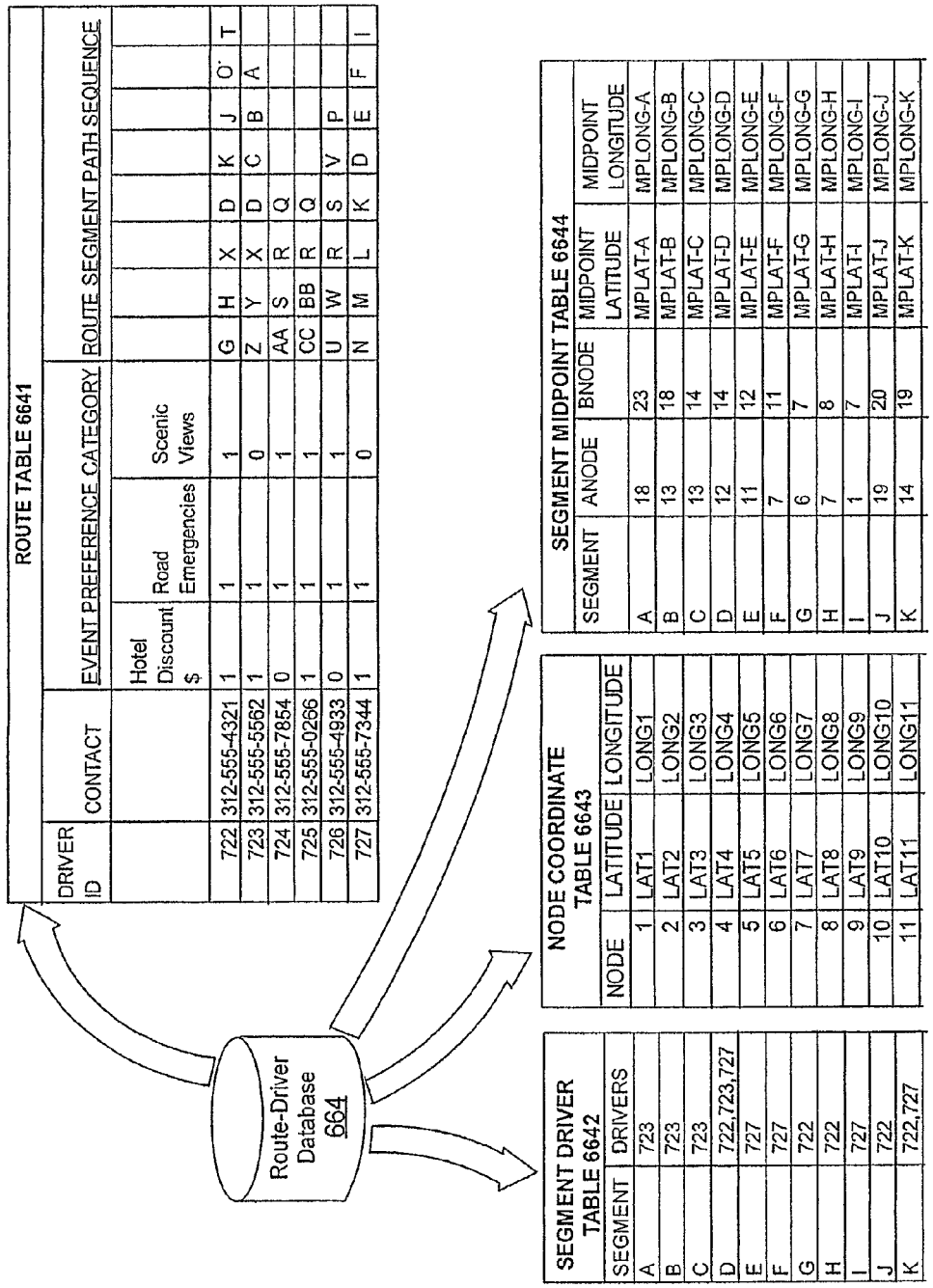
FIG. 6 illustrates four data tables that are generated and stored in the Route-Driver Database for DSNS processing in accordance with the present invention.

FIG. 6 shows the four main data tables that comprise the Route-Driver Database 664 and are used to assemble data to determine and relate locations of said event report and positions of said current drivers. Route Table 6641 contains driver identification, contact and preference information, and the strings of route segments that comprise each said driver's route. Segment Driver Table 6642 contains the list of route segments that are being used by one or more said Drivers 700, and, for each segment, the list of said Drivers 700 that use said segment. Node Coordinate Table 6643 list the geographic nodes of said route segments, and the geographic coordinates of each said node. Segment Midpoint Table 6644 contains a list of said route segments, the geographic nodes for each said route segment, and the geographic coordinates for the geographic midpoints of said route segments.

Figure 7:
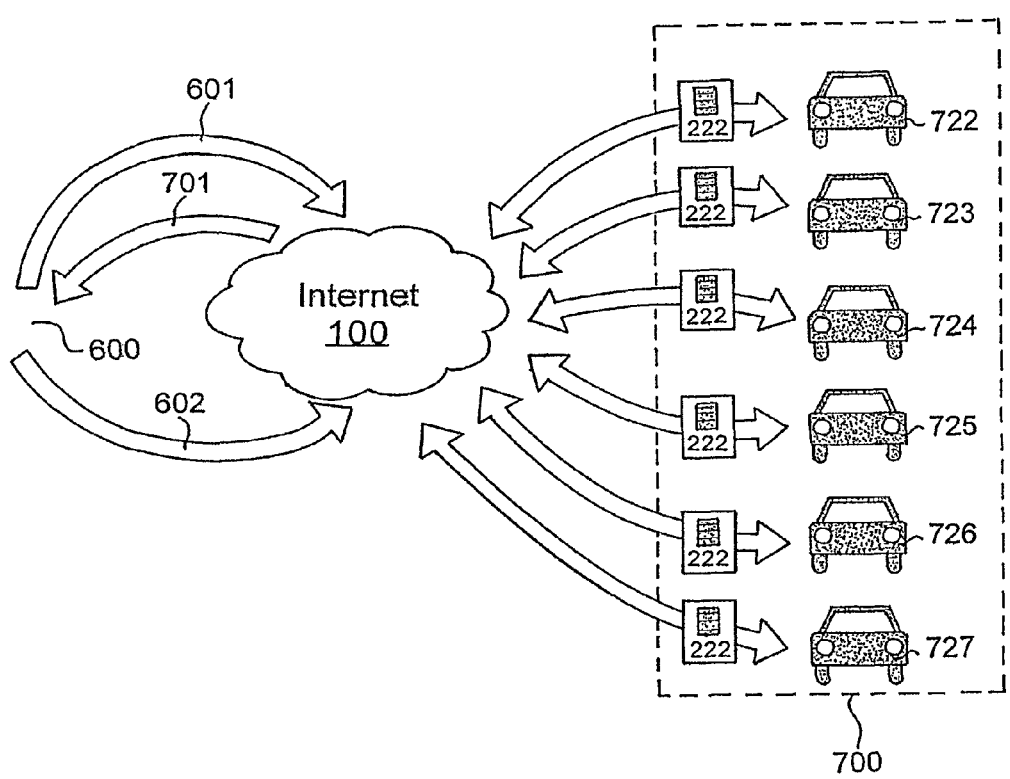
FIG. 7 shows the community of drivers who use mobile devices, such as smartphones, to receive/respond to event alerts and receive event notifications from the DSNS.

FIG. 7 shows Drivers 700, the figurative community of drivers who would communicate with said DSNS 600 using said Smartphone device 222. FIG. 7 illustrates individual Drivers 722, 723, 724, 725, 726, and 727. Said DSNS 600 sends said event alerts, receives said driver responses, and transmits said event notifications to a selected set of Drivers 700, depending upon the locations associated with said event reports 301, 401 and 501, and the current position of drivers along their routes.

Figure 8:
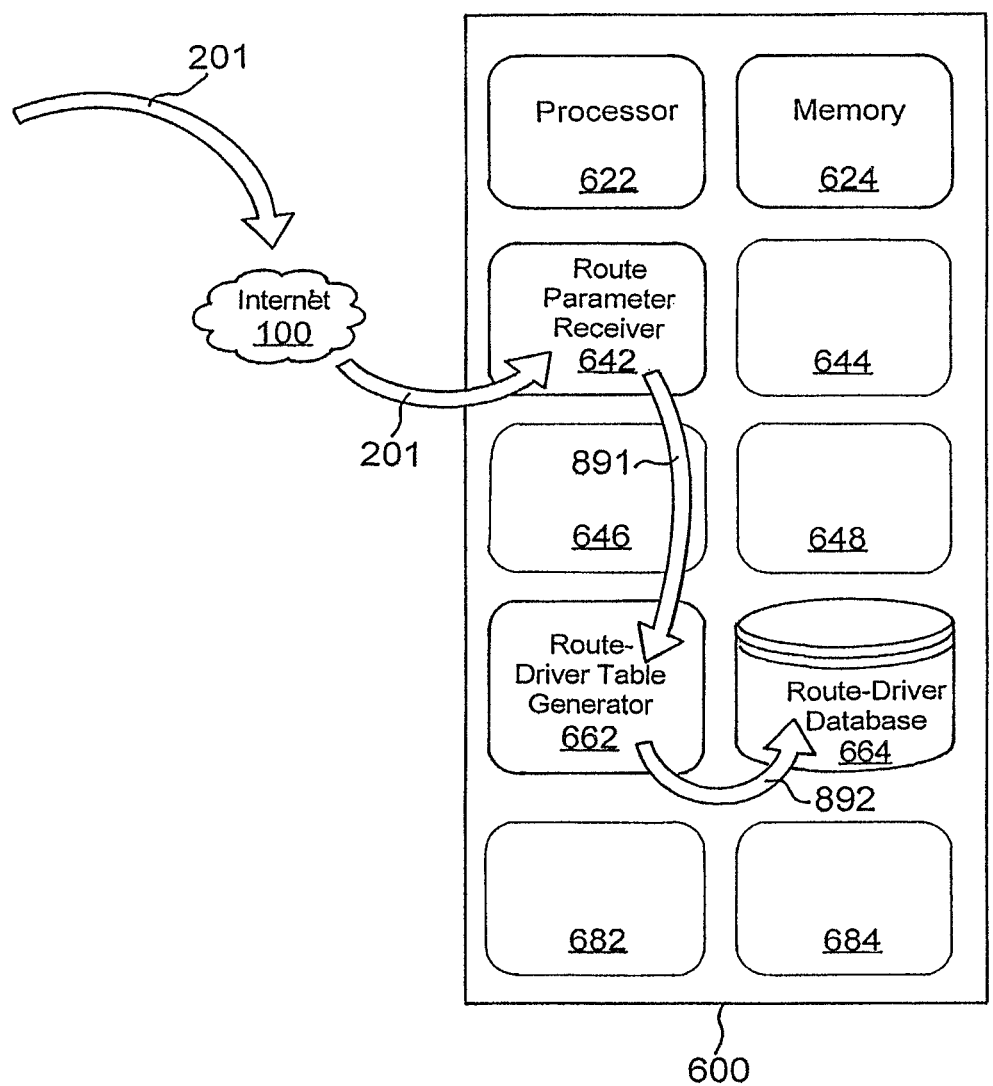
FIG. 8 illustrates the data flow of route parameters received by the DSNS, Route-Driver data tables generated from these parameters, and the storage of same in the Route-Driver Database in accordance with the present Invention.

FIG. 8 shows route table generation by said DSNS 600. Said Route Parameter Receiver device 642 receives said route parameter data 201 and, in interaction 891, transfers said route parameter data to said Route-Driver Table Generator logic 662. Said Route-Driver Table Generator logic 662 generates said Route Table 6641, said Segment Driver Table 6642, said Node Coordinate Table 6643, and said Segment Midpoint Table 6644 from said route parameter data. Said Route-Driver Table Generator logic, in interaction 892, transfers and stores said Route-Driver Table data in said Route-Driver Database 664.

Figure 9:
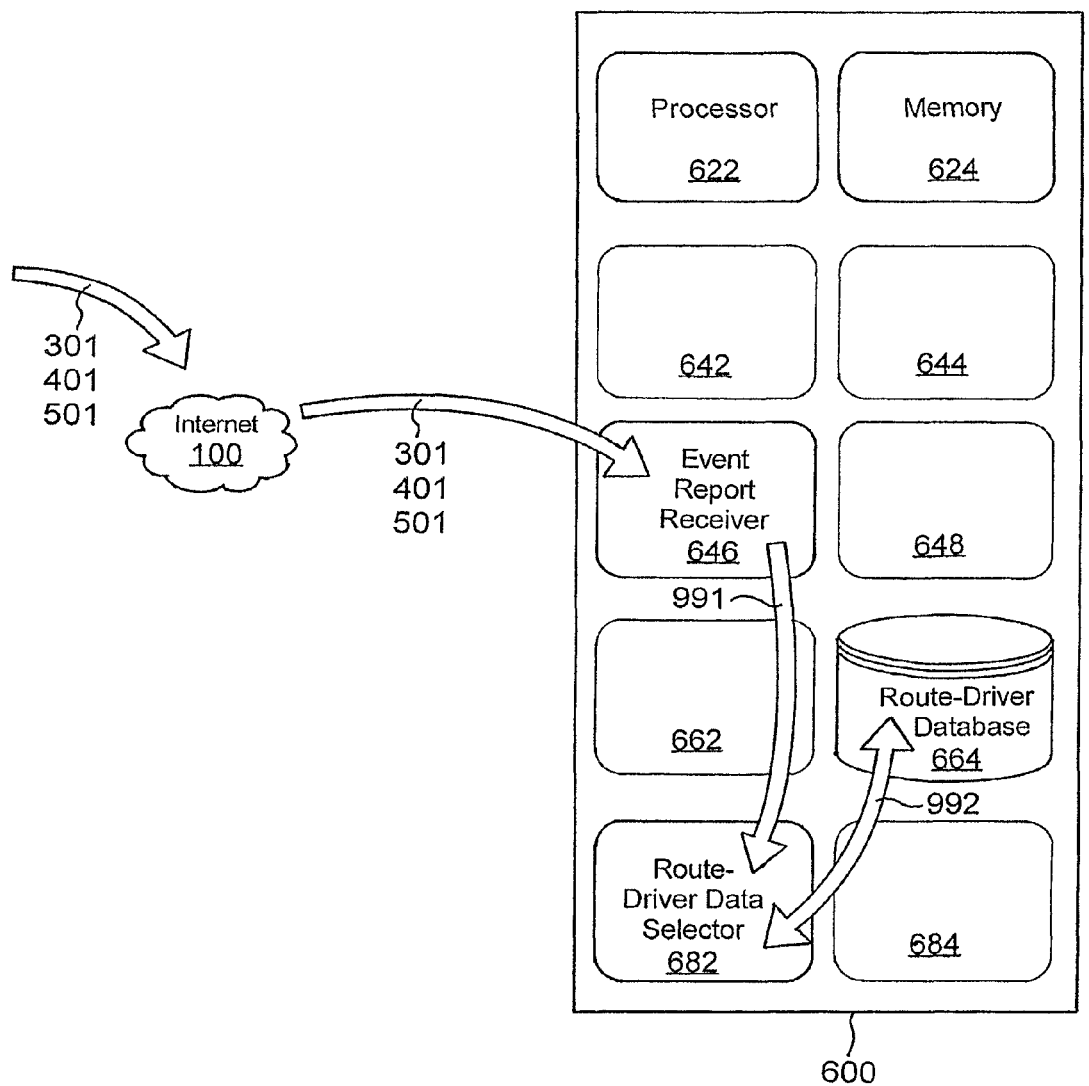
FIG. 9 illustrates the data flow of an event report received by the DSNS and the selection by the DSNS of Route-Driver data tables that include the event location in accordance with the present Invention.

FIG. 9 shows event reporting and route-driver data selection by said DSNS 600. Said Event Report Receiver 646 receives said event report 301, 401 or 501, and, through interaction 991, transfers said event report data 301, 401 or 501 to said Route-Driver Data Selector logic 682. Said Route-Driver Data Selector logic 682, through interaction 992 with said Route-Driver Database, identifies, selects and assembles Route-Driver data records which include the geographic coordinate location corresponding to the location of said event report data 301, 401, or 501.

Figure 10:
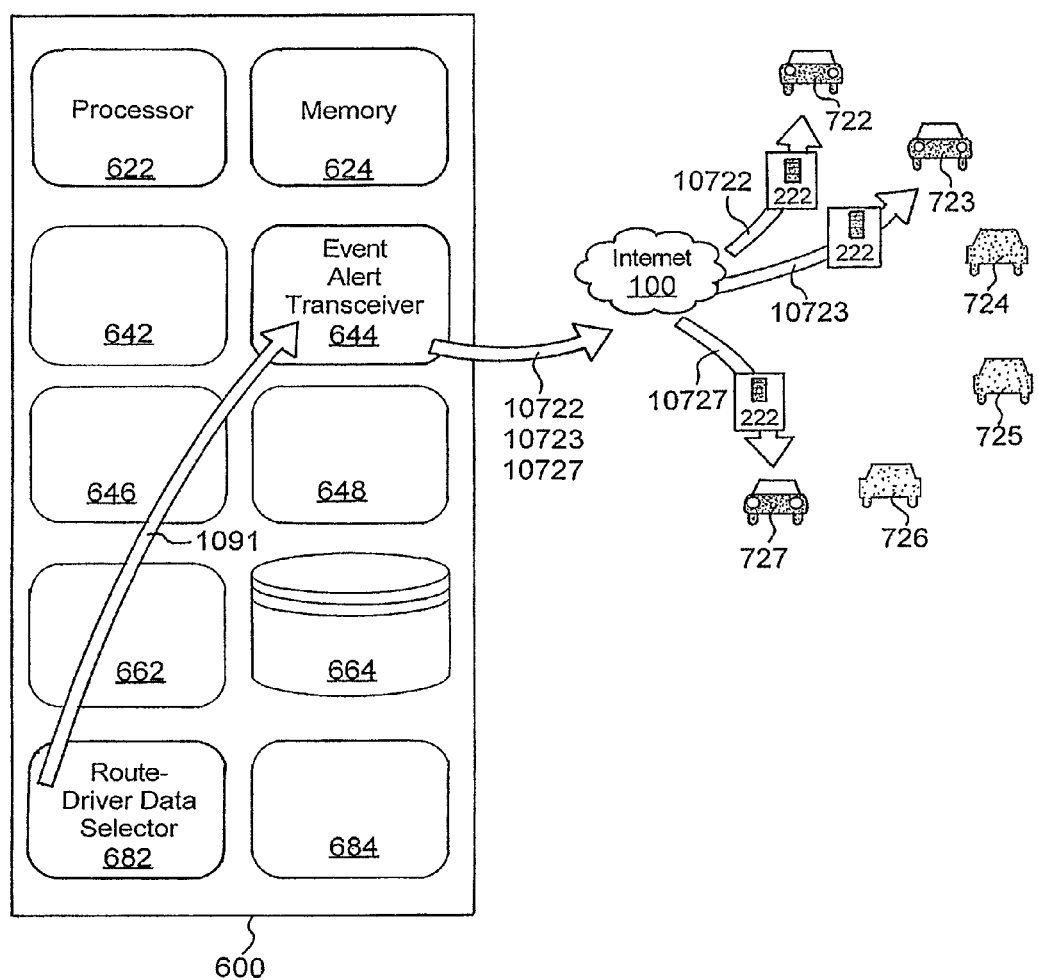
FIG. 10 illustrates the data flow for transmission of event report alerts to drivers of the selected routes by the DSNS, in accordance with the present Invention.

FIG. 10 shows the event alert messaging by said DSNS 600. If said Route-Driver Data Selector logic 682 selects at least one said Route-Driver Route Table 6641 record, an appropriate Event Alert including driver contact information is directed to said Event Alert Transceiver device 644 through interaction 1091. Said Event Alert Transceiver transmits said Event Alert to the selected driver(s) via smartphone technology 222. In the FIG. 10 example, said Event Alert Transceiver device 644 prepares and transmits said event alerts 10722, 10723 and 10727 via the Internet 100 to Drivers 722, 723 and 727.

Figure 11:
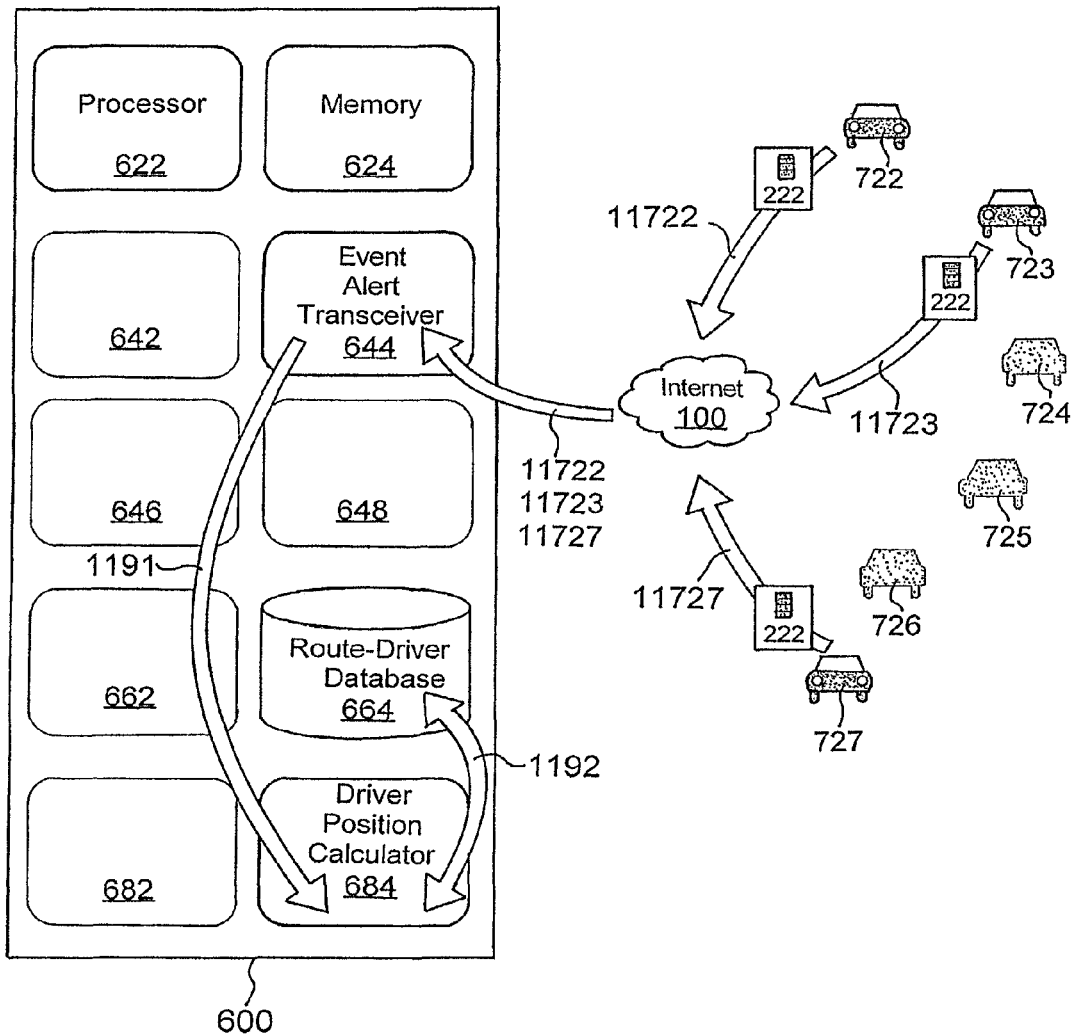
FIG. 11 illustrates the data flow of selected driver responses to the event report alerts, in accordance with the present Invention.

FIG. 11 shows driver alert response messaging and driver route position calculating by said DSNS 600. Said Event Alert Transceiver device 644 receives alert responses from the selected drivers to whom the Event Alert 10722, 10723 and 10727 have been previously transmitted, including geographic coordinate information via smartphone technology 222. In the FIG. 11 example, said Event Alert Transceiver receives responses 11722, 11723 and 11727 from drivers 722, 723 and 727. Said Event Alert Transceiver device 644, through interaction 1191 transfers the received geographic coordinate information to said Driver Position Calculator 684. Said Driver Position Calculator 684, through interaction 1192 with said Route-Driver Database 664, identifies each driver's current position along said selected Route-Driver route associated with that driver using geographic coordinate information contained in said responses 11722, 11723 and 11727 coupled with the assemblage of Route-Driver data to calculate driver route position.

Figure 12:
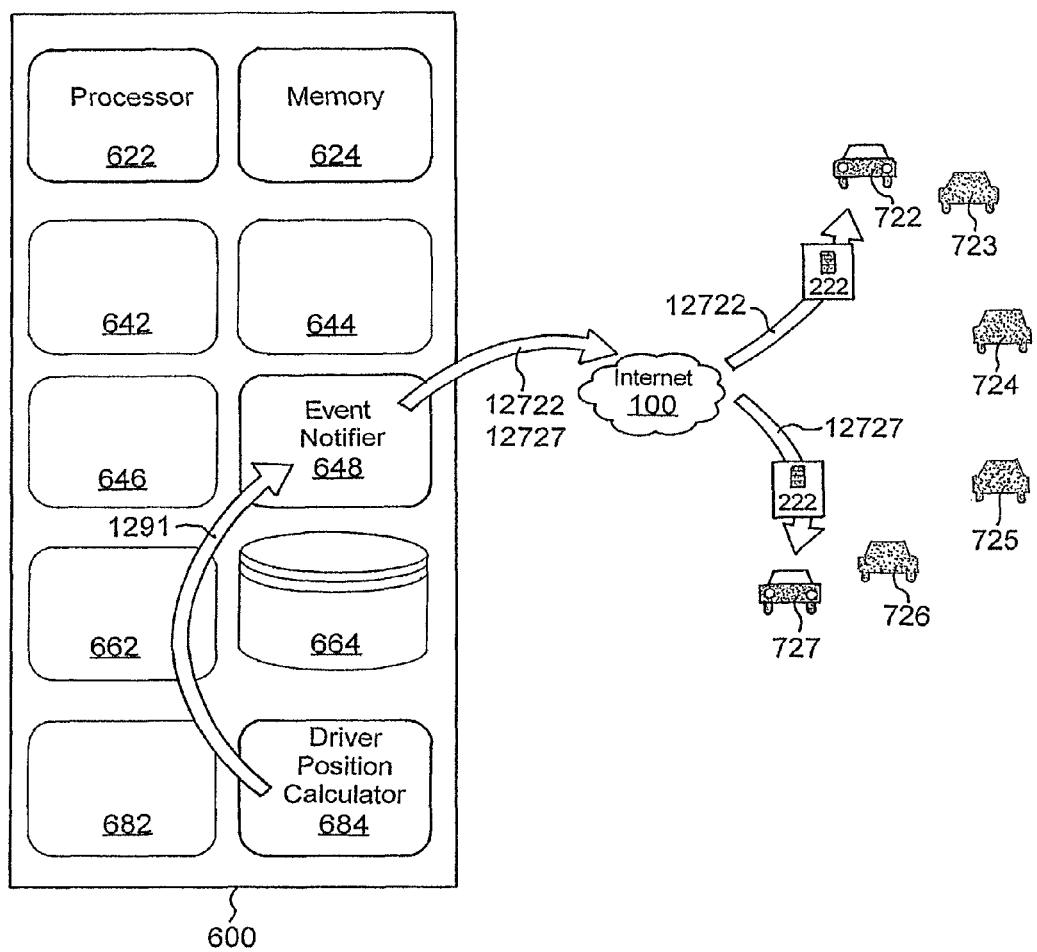
FIG. 12 illustrates the data flow of driver notification by the DSNS of event information, in accordance with the present Invention.

FIG. 12 shows the selected driver event notification messaging by said DSNS 600. If at least one driver of the drivers 722, 723 and 727 is positioned so as the said event 301, 401 or 501 is located ahead of the driver's current position, said Driver Position Calculator logic 684, through interaction 1291, transfers the driver contact information for the applicable driver(s) to said Event Notifier device 648. In the FIG. 12 example, said Event Notifier device 648 prepares and transmits event notifications 12722 and 12727 to Drivers 722 and 727, as directed by the Driver Position Calculator logic in interaction 1291. Driver 723 does not receive the event notification because the Driver Position Calculator logic 684 determined that the applicable event is not ahead of driver 723 or is such a short term event that it is too far ahead of driver 723, so as to be irrelevant to driver 723, and hence did not transfer driver contact information for driver 723 to the Event Notifier 648 or direct the Event Notifier to transmit the event notification to driver 723.

Six Driver/Six Route Illustrative Examples of Route-Driver Database Use

Figure 13:
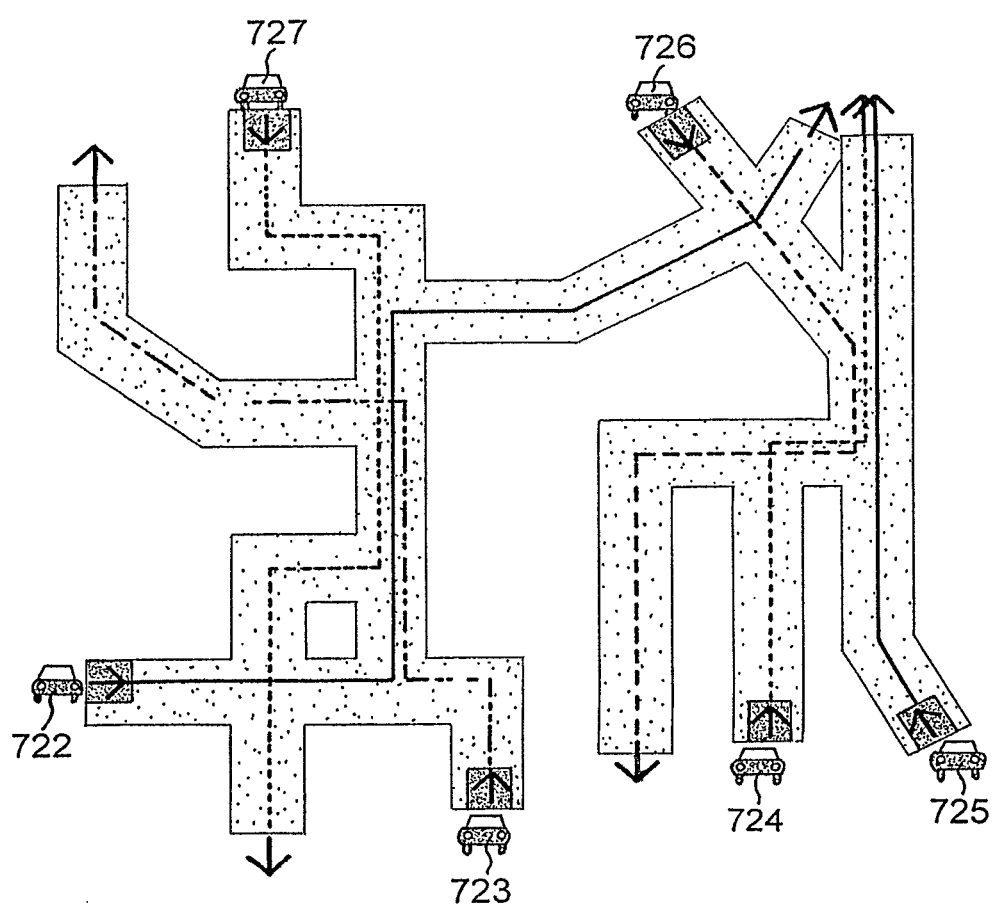
FIG. 13 displays an illustrative six-driver six-trip route schematic depicting driver starting positions and initial portions of their planned routes.

FIG. 13 illustrates a route schematic example of the routes and starting positions of said Drivers 722, 723, 724, 725, 726 and 727.

Figure 13A:
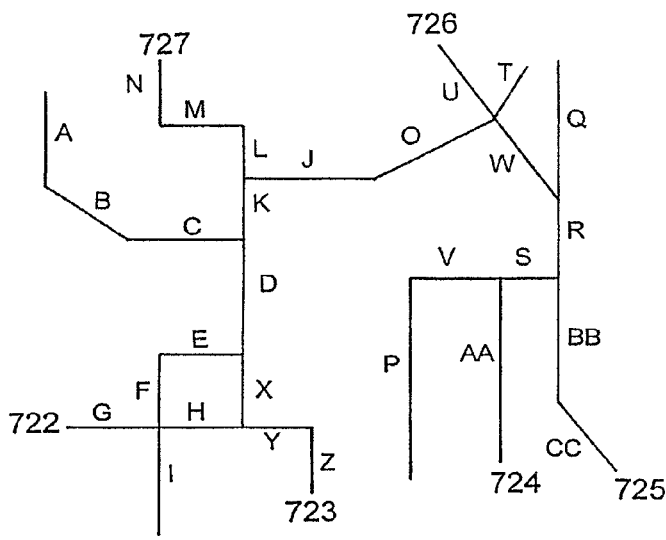
FIG. 13a illustrates the route configuration data that emanates from the Route and Segment Driver Tables within the Route-Driver Database in accordance with the present Invention.

FIG. 13a displays, for said route schematic example, the route configuration with labeled route segments. Said Route Table 6641 contains sequential segment strings of said Drivers 722, 723, 724, 725, 726, and 727, as well as driver contact information and preferred driver event category. Said Segment Driver Table 6642 is a tabulation of all segments currently utilized by said Drivers 722, 723, 724, 725, 726, 727, and delineates the drivers that utilize each of the segments.

Figure 13B:
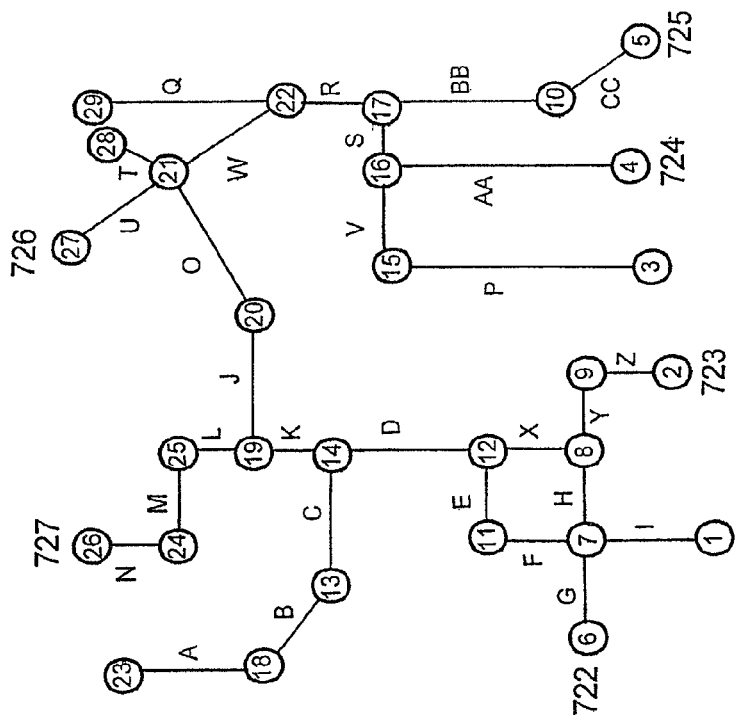
FIG. 13b illustrates the route configuration data that emanates from the Route, Segment Driver and Node Coordinate Tables within the Route-Driver Database in accordance with the present Invention.

FIG. 13b displays, for said route schematic example, the route configuration with labeled route segments and labeled segment nodes. Said Node Coordinate Table 6643 contains the latitude and longitude coordinates for each of the said segment nodes numbers.

FIG. 13c displays, for said route schematic example, the route configuration with labeled route segments, segment nodes and segment geographic coordinate midpoints. A segment midpoint is calculated as the exact geographic center of the segment.

Figure 14:
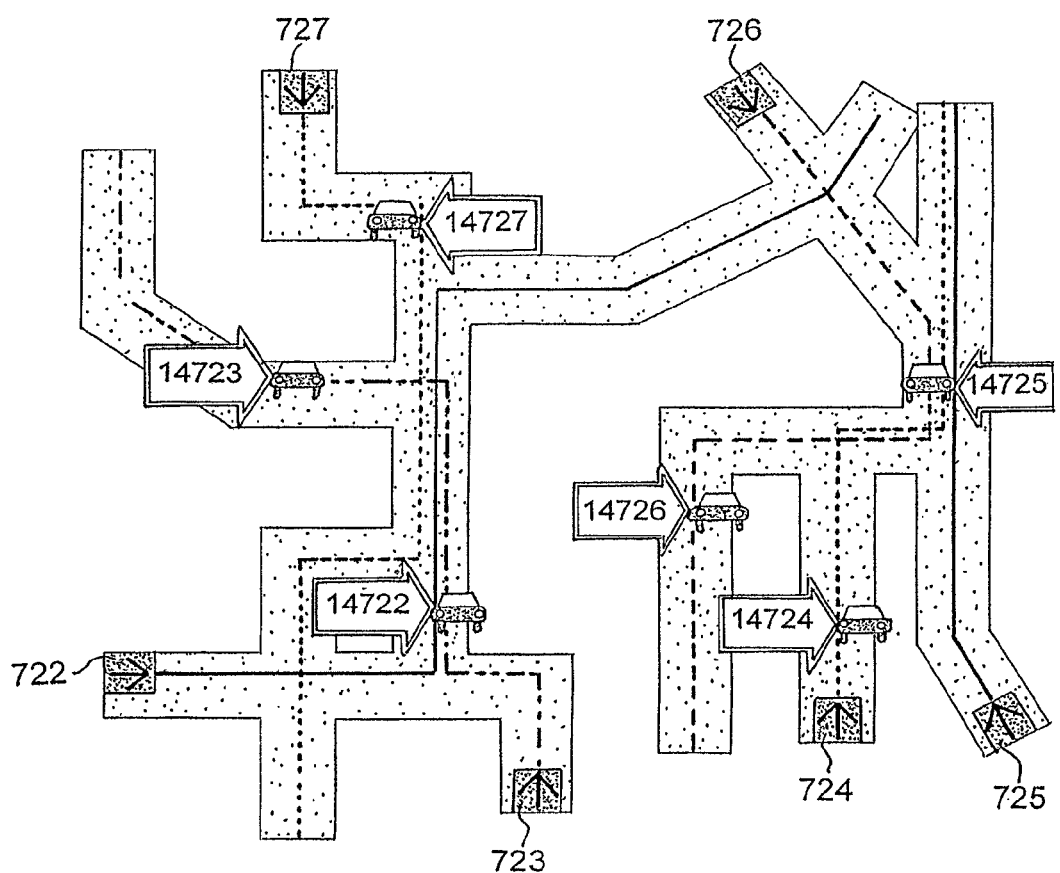
FIG. 14 displays the illustrative six-driver six-route schematic depicting current driver route positions and initial portions of their planned routes.

FIG. 14 illustrates a route schematic example of the routes and current positions of Drivers 14722, 14723, 14724, 14725, 14726 and 14727.

Figure 15:
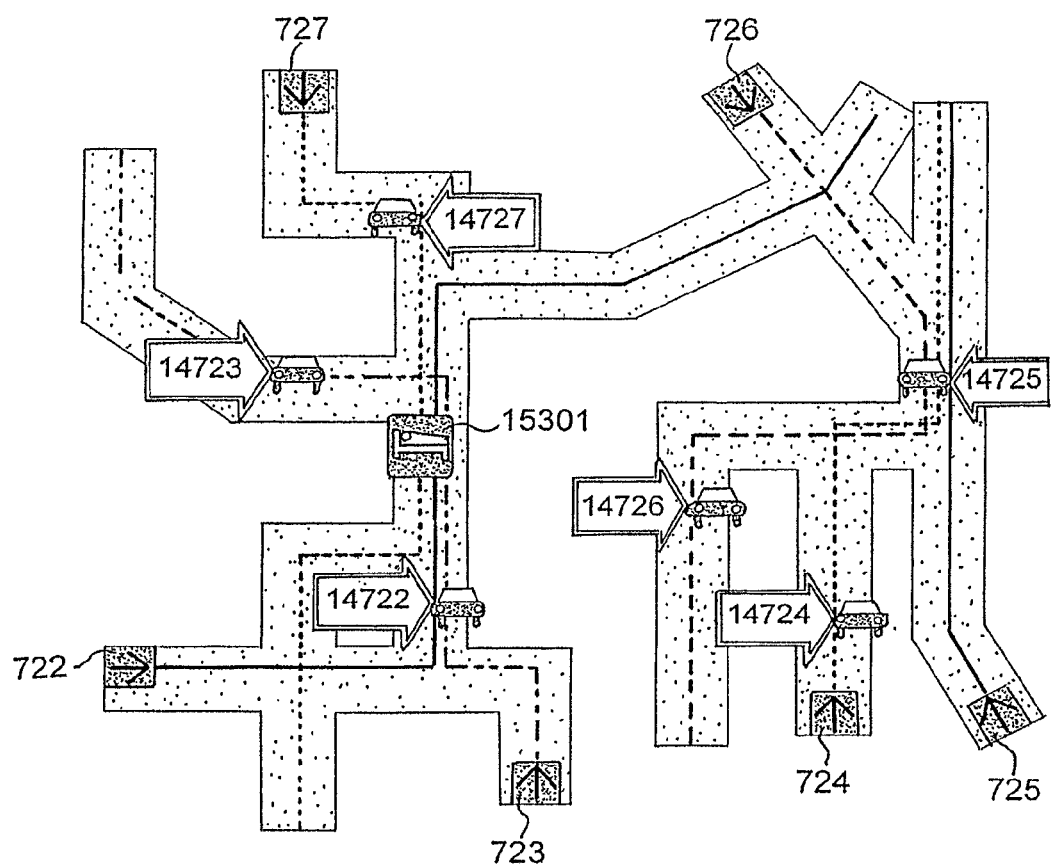
FIG. 15 displays an illustrative route schematic depicting the location of a Service Provider-reported event (a hotel service offering) with current driver route positions.

FIG. 15 illustrates a route schematic example of the routes, current positions of said Drivers 14722, 14723, 14724,14725, 14726 and 14727 and the location of Service Provider Event Report 15301.

FIG. 15a illustrates the process by which said event report is placed on a route segment through the use of said Route-Driver Tables. The geographic coordinates of said Service Provider Event Report 15301 are shown as Event Location Coordinates 15a1. From said geographic coordinates a geographic coordinate area search range 15a2 is constructed. All midpoints from said Segment Midpoint Table 6644 that lie within midpoint coordinate search range 15a2 are identified. Segment numbers and node numbers from said Segment Table 6644 and said Node Coordinate Table 6643 are then used to geographically construct a set of segments for proximity search, in this illustrative case, these segments are C, D, E, J, K, L, and M. Proximity search, in this case, determines that segment D is in closest proximity to the event location, consequently the said Service Provider Report 15301 is to be placed in its offset location on Segment D, which can be observed in 15a3.

Figure 15B:
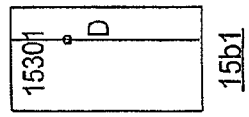
FIG. 15b illustrates the process by which drivers whose routes include the event report location are selected and alerted using Route-Driver Database tables in accordance with the present Invention.

FIG. 15b illustrates how drivers are selected and alerted by an event report through the use of said Route-Driver Tables. Said Service Provider Event Report 15301 placement location on segment D can be observed in 15b1. Said Segment Driver Table 6642 is accessed to determine the drivers whose routes include said segment D. Said Route Table 6641 is then accessed to filter out drivers whose preferences do not include the event report interest category. Said Route Table 6641 is then used to acquire driver contact information so that driver alerts can be made.

FIG. 15c illustrates how the current location of alerted drivers are determined so that notification will be made only to drivers positioned to find the event information relevant and useful, in this illustration, the focus is driver 722. The current geographic coordinates of alerted said driver 722 is displayed in 15c1. From said geographic coordinates a geographic coordinate area search range 15c2 is constructed. All midpoints from said Segment Midpoint Table 6644 that lie within midpoint coordinate search range 15c2 are identified. Segment numbers and node numbers from said Segment Table 6644 and said Node Coordinate Table 6643 are then used to geographically construct a set of segments for proximity search, in this illustrative case, these segments are D, E, F, G, H, X and Y. Proximity search, in this case, determines that segment X is in closest proximity to the current position of said driver 722, consequently said driver 722 is to be placed in its offset location on Segment X, which can be observed in 15c3. Said Route Table 6641 is then accessed, where it determined that segment X is prior to segment D, which is where said Service Provider Event Report 15301 is placed, so that said driver 722 will be notified of said Service Provider Event Report. Also to be provided will be the distance ahead that said Service Provider Event is located along the route of said driver 722. Note: should an event location and a current driver location both be placed on the identical segment, the placement distance between both entities on the single segment is calculated.

Figure 16:
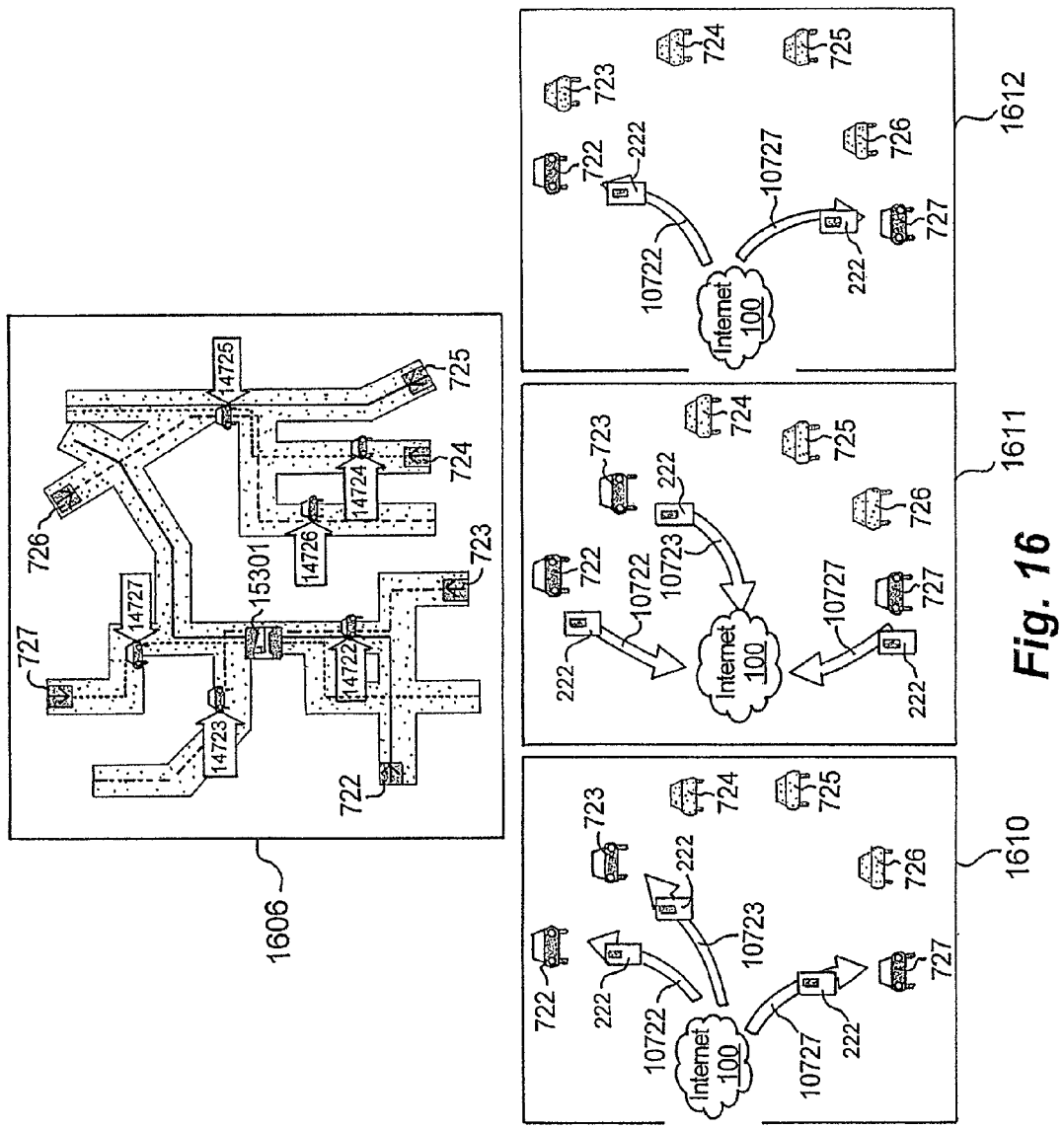
FIG. 16 displays the data flow summary process for driver alert and notification for a service provider event report, in accordance with the present Invention.
Figure 17:
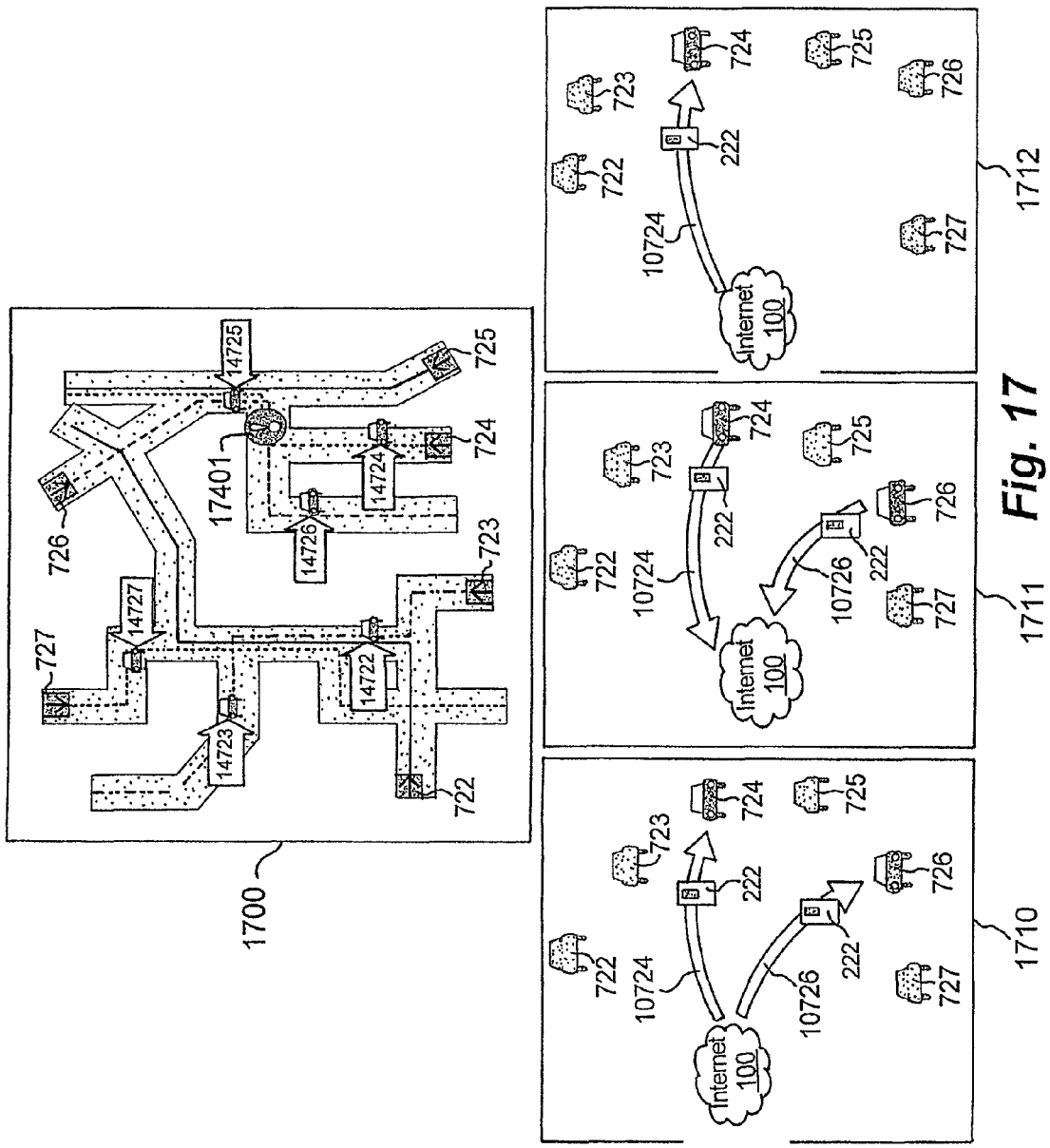
FIG. 17 displays the data flow summary process for driver alert and notification for an emergency event report in accordance with the present Invention.
Figure 18:
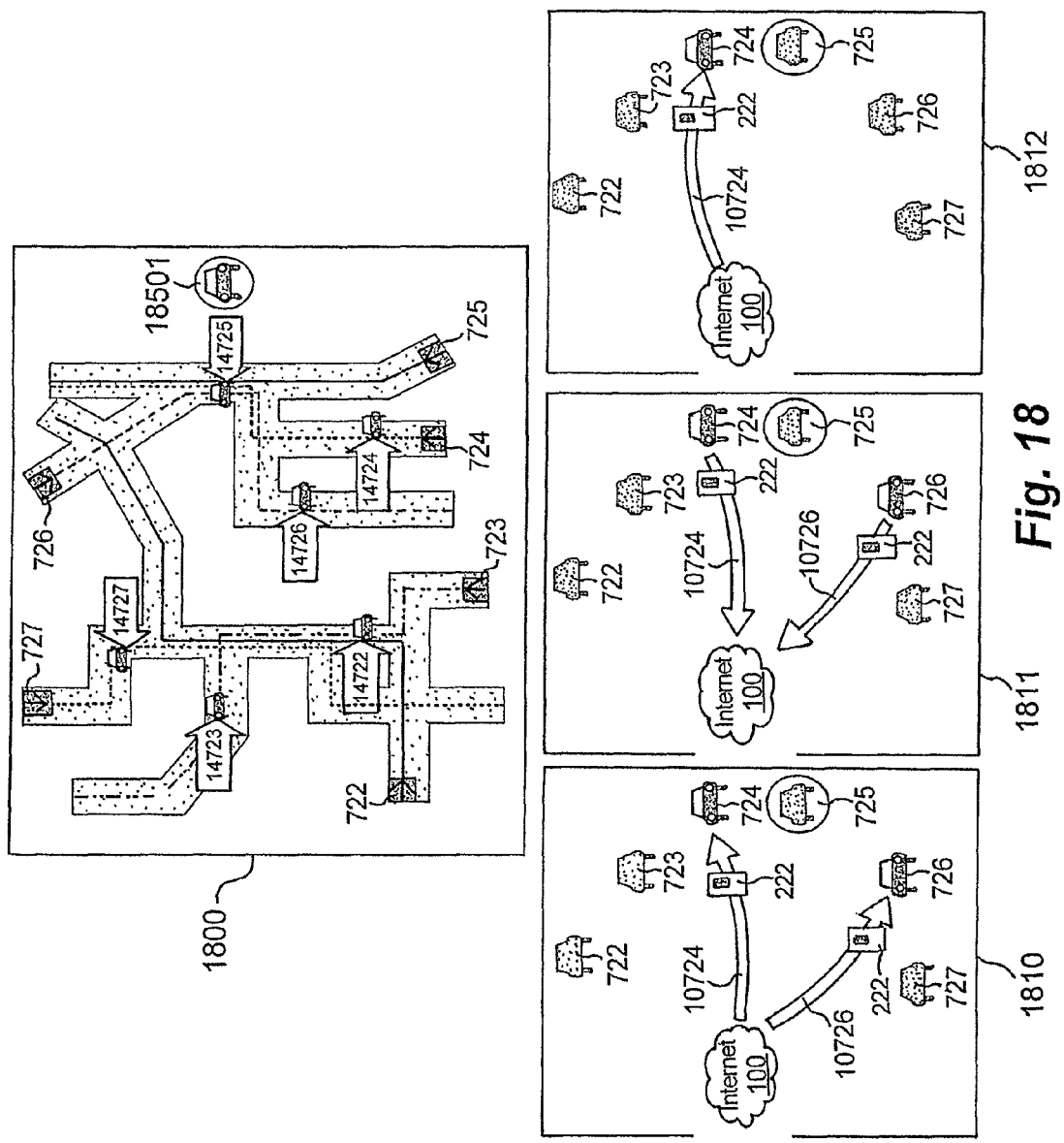
FIG. 18 displays the data flow summary process for driver alert and notification for a Driver-Initiated event report in accordance with the present Invention.

FIG. 16 summarizes the driver selection and notification process for a sample service provider event report 15301, incorporating route schematic 1606, event alert 1610, response 1611 and event notification 1612. FIG. 17 summarizes the driver selection and notification process for a sample emergency event report 17401, incorporating route schematic 1706, event alert 1710, response 1711 and event notification 1712. FIG. 18 summarizes the driver selection and notification process for a sample driver observation event report 18501, incorporating route schematic 1806, event alert 1810, response 1811 and event notification 1812.

Second Embodiment

Figure 19:
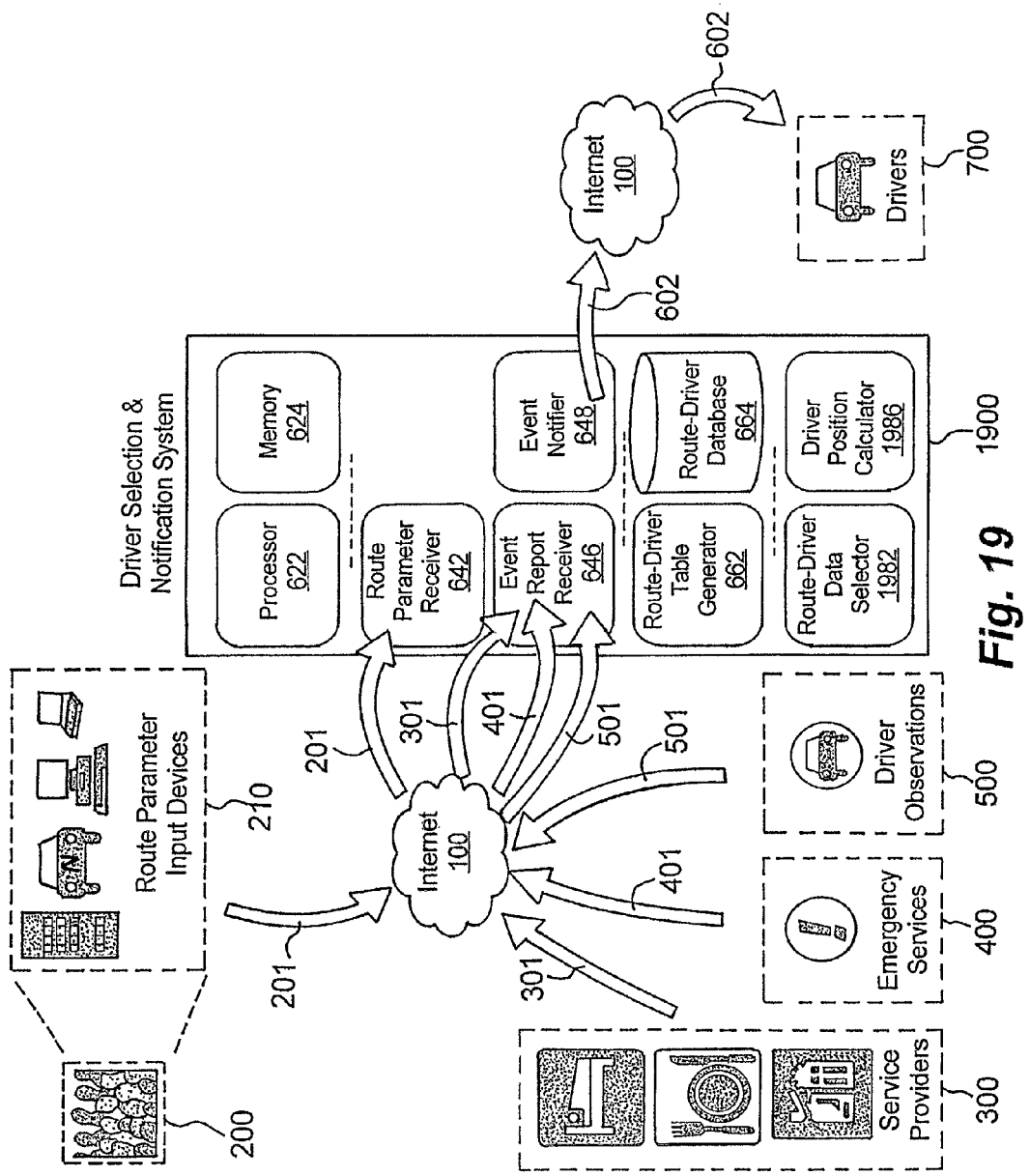
FIG. 19 illustrates a second embodiment of the Driver Selection & Notification System (DSNS) applicable for a centralized highway navigation service, in accordance with the present Invention.

FIG. 19 shows a second embodiment of a Driver Selection & Notification System (DSNS) 1900, which differs from said DSNS 600 in that it incorporates a centralized navigation service technology into the functionality, and primarily differentiates itself from said DSNS 600 by negating the requirement for event alerts to obtain driver positioning information. Instead, the DSNS 1900 utilizes the centralized navigation service to maintain consistent GPS positional contact with all drivers. FIG. 19 is a high-level functional diagram depicting the said DSNS 1900 and its interactions, using similar components as those described above with reference to DSNS 600 and facilitated by Internet 100, with said Highway Trip Planners 200 using said input devices 210 by which said user route parameter data 201 is prepared and sent to said DSNS 1900, said Service Providers 300 sending event reports 301 to said DSNS 1900, said Emergency Services 400 sending event reports 401 to said DSNS 1900, said Driver Observations 500 sending event reports 501 to said DSNS 1900, and said Drivers 700 receiving event notifications 602 from said DSNS 1900.

Figure 20:
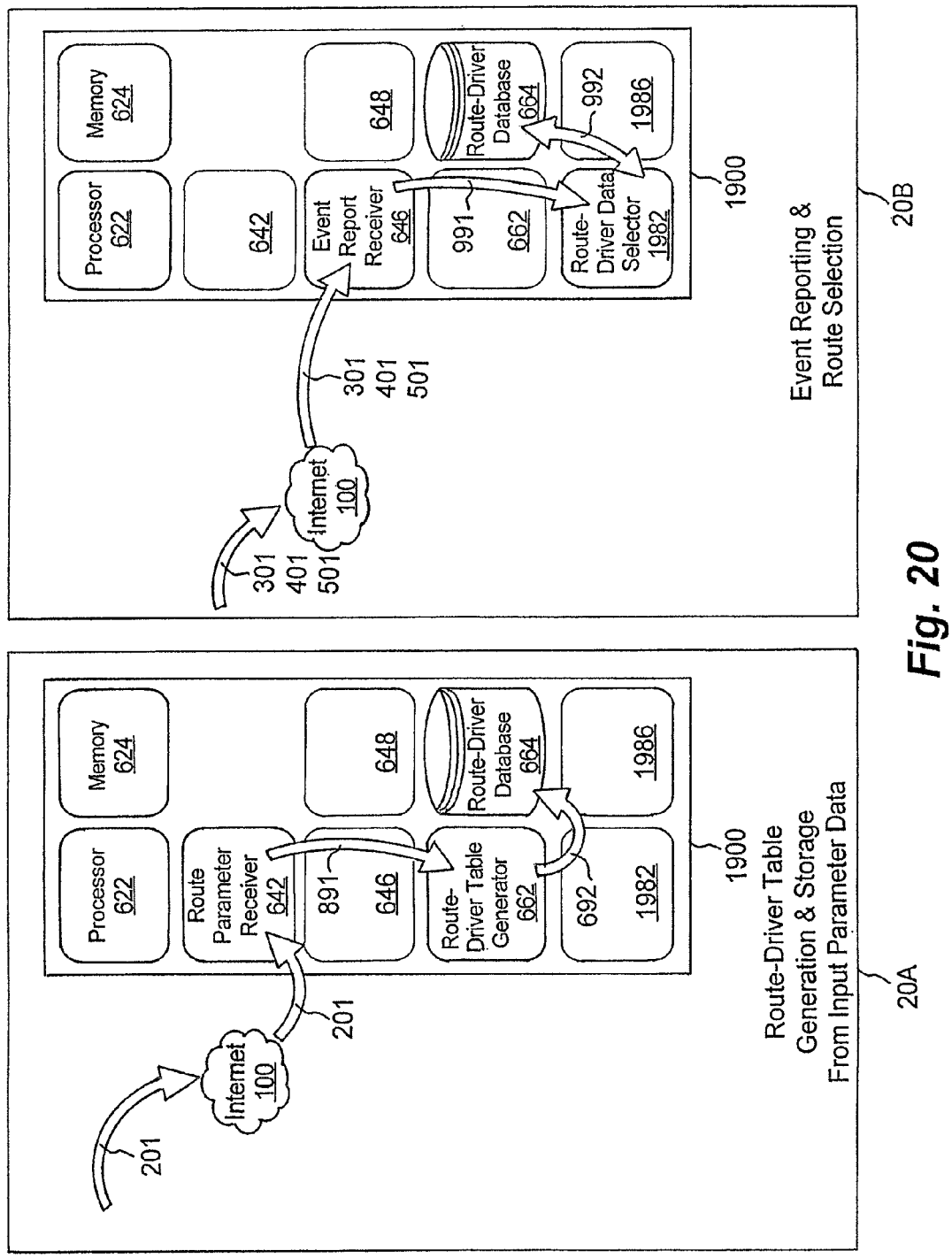
FIG. 20 illustrates interactions with the DSNS applicable for a centralized highway navigation service including the data flow of route parameters received by the DSNS, generating and storing the associated Route-Driver data tables, and the data flow of an event report received by the DSNS and the selection of routes and drivers that include the event location, in accordance with the present Invention.

FIG. 20 shows, in block 20A, the route generation performed by said DSNS 1900 in a centralized navigation service technology environment. Said Route Parameter Receiver device 642 receives said route parameter data 201 and, in said interaction 891, transfers data to said Route-Driver Table Generator logic 662. Said Route-Driver Table Generator logic 662 creates Route-Driver data tables, that include route segment strings, segment and node geographic coordinate latitude and longitude values, and driver identification and interest information, including driver contact information such as a smartphone address, based on said route parameter data 201, and stores the Route-Driver data in Route-Driver Database 664. In block 20B is shown the event reporting and route-driver data selection by said DSNS 1900 in a centralized navigation service technology environment. Said Event Report Receiver 646 receives said event report 301, 401 or 501, and, through said interaction 991, transfers said event report data 301, 401 or 501 to said Route-Driver Selector device 1982. Said Route-Driver Selector device 1982, through said interaction 992 with said Route-Driver Database, identifies and selects Route-Driver data records which contain the geographic location corresponding to the location included in said event report data 301, 401, or 501.

Figure 21:
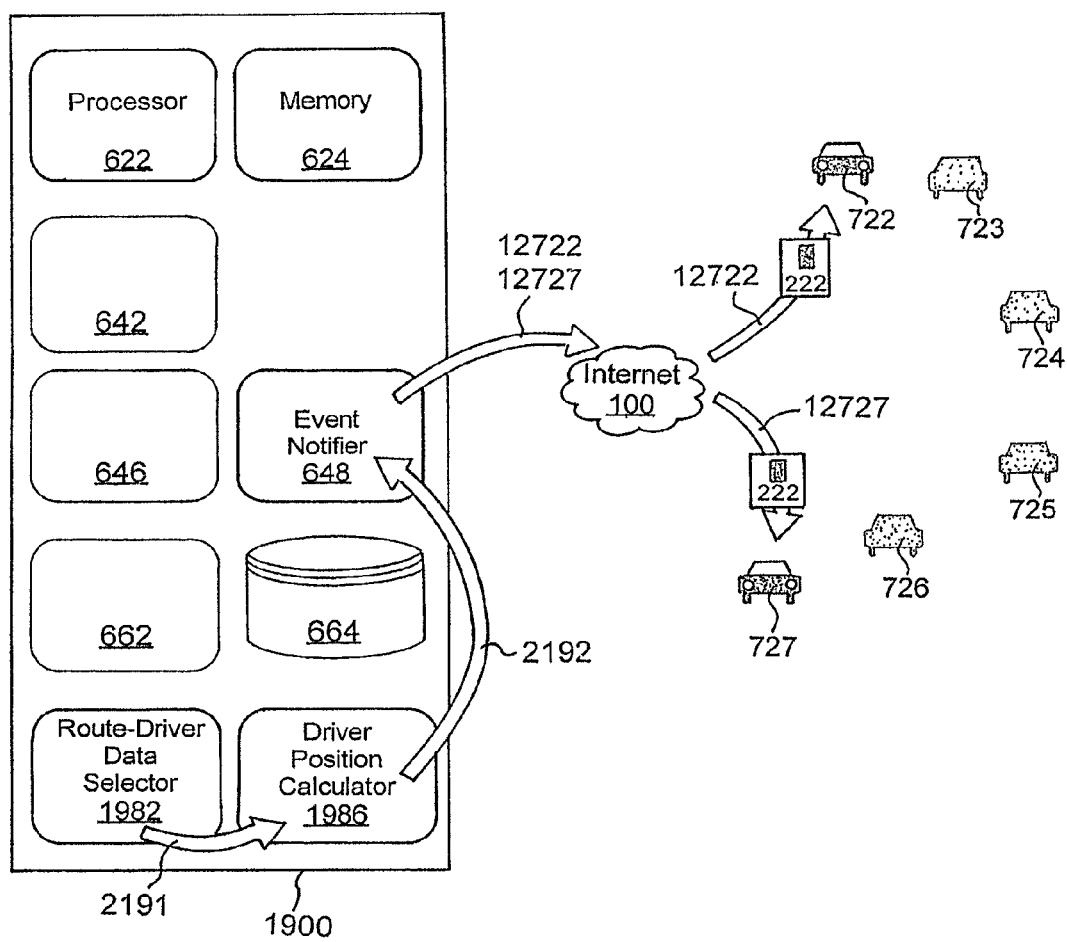
FIG. 21 illustrates the data flow to and from the DSNS applicable for a centralized highway navigation service associated with driver event notification, in accordance with the present Invention.

FIG. 21 displays the selected driver event notification by said DSNS 1900 in a centralized navigation service technology environment. If at least one said Route-Driver data record is selected by said Route-Driver Selector logic 1982, through interaction 2191, Driver Position Calculator logic 1986 accesses the current location of selected drivers using the centralized navigation service. If at least one of the selected drivers has a compatible preference category and is positioned so as said event 301, 401 or 501 is located ahead of the driver's current position, but not so far ahead as to make the event irrelevant, said Driver Position Calculator logic 1986, through interaction 2192, transfers driver identification information and a directive to transmit the applicable event notification to the identified driver, to said Event Notifier device 648. In the FIG. 21 example, said Event Notifier device 648 prepares and transmits event notifications 12722 and 12727 to Drivers 722 and 727 in accordance with the directives from the Driver Position Calculator logic 1986.

As described in detail above, the present Invention provides improvements not found in the previously proposed methodologies. For example, the present Invention provides an improved technique for generating and interrelating multiple types of trip routing information. It also provides a technique for confining traveler notification of events to only those that are germane to individual trip routes and interests. It also provides a technique for informing travelers of transitory events that occur along their travel route. It also provides an improved technique which facilitates the consistent delivery of relevant and useful information to a traveler in a timely and efficient manner.

What is claimed:

1. An article of manufacture for determining whether to notify a traveler of events proximate to a travel path, comprising:
   non transitory storage media; and
   logic stored on the storage media, wherein the stored logic is configured to be executable by a processor and thereby cause the processor to operate so as to:
   store, in association with an identifier of a user and contact information for contacting the user while traveling, geographic coordinates defining a start point and an end point of each of multiple contiguous segments between a start location and an end location of a travel path;
   receive a description of an event and an event location;
   determine, based on geographic coordinates for the received event location, a geographic coordinate area search range;
   identify all midpoints of the multiple segments that lie within the determined geographic coordinate search range;
   determine, based on the identified midpoints, a set of segments;
   proximity search the determined set of segments to identify one segment within the searched set of segments that is in closest proximity to the received event location;
   identify a closest offset event location along the identified one segment; and
   determine, based on the identified closest offset event location, if the user is to be notified of the event.

2. The article of manufacture in accordance with claim 1, wherein execution of the stored logic thereby causes the processor to operate so as to also:
   determine, based on geographic coordinates of a current travel location of the user, another geographic coordinate area search range;
   identify all midpoints of the multiple segments that lie within the other geographic coordinate search range;
   determine, based on the identified midpoints of the multiple segments that lie within the other geographic coordinate search range, another set of segments;
   proximity search the determined other set of segments to identify one segment within the searched other set of segments that is in closest proximity to the current travel location of the user; and
   identify a closest offset user location along the identified one segment;
   wherein determining if the user is to be notified of the event is based also on the identified closest offset user location.

3. The article of manufacture in accordance with claim 2, wherein execution of the stored logic thereby causes the processor to operate so as to also:
   receive, from the user, the current travel location of the user prior to determining the other geographic coordinate area search range.

4. The article of manufacture in accordance with claim 3, wherein execution of the stored logic thereby causes the processor to operate so as to also:
   receive, from the user, a route distance to event parameter;
   compute a route distance between the identified closest offset event location and the identified closest offset user location; and
   compare the received route distance to the computed route distance;
   wherein determining if the user is to be notified of the event is based also on a result of the comparison.

5. The article of manufacture in accordance with claim 3, wherein execution of the stored logic thereby causes the processor to operate so as to also:
   determine, based on the received description of an event, a route distance to event parameter;
   compute a route distance between the identified closest offset event location and the identified closest offset user location; and
   compare the determined route distance to the computed route distance;
   wherein determining if the user is to be notified of the event is based also on a result of the comparison.

6. The article of manufacture in accordance with claim 1, wherein execution of the stored logic thereby causes the processor to operate so as to also:
   receive, from the user, a proximity distance;
   compute an offset distance between the identified closest offset event location and the event location; and
   compare the received proximity distance to the computed offset distance;
   wherein determining if the user is to be notified of the event is based also on a result of the comparison.

7. The article of manufacture in accordance with claim 1, wherein execution of the stored logic thereby causes the processor to operate so as to also:
   determine, based on the received description of an event, a proximity distance;
   compute an offset distance between the identified closest offset event location and the event location; and
   compare the received proximity distance to the computed offset distance;
   wherein determining if the user is to be notified of the event is based also on a result of the comparison.

8. The article of manufacture in accordance with claim 1, wherein execution of the stored logic thereby causes the processor to operate so as to also:
   receive an identification of one or more types of events of interest to the user; and
   determine that the received description of the event corresponds to the received identified one or more types of events prior to determining the geographic coordinate area search range.

9. A method for determining whether to notify a traveler of events proximate to a travel path, comprising:
   storing, by a computer in association with an identifier of a user and contact information for contacting the user while traveling, geographic coordinates defining a start point and an end point of each of multiple contiguous segments between a start location and an end location of a travel path;

receiving, by the computer via a communications network, a description of an event and an event location;

determining, by the computer based on geographic coordinates for the received event location, a geographic coordinate area search range;

identifying, by the computer, all midpoints of multiple contiguous segments, between a start location and an end location of a travel path associated with a user, that lie within the determined geographic coordinate search range, wherein each of the multiple contiguous segments is defined by geographic coordinates of a start point and an end point of that segment;

determining, by the computer based on the identified midpoints, a set of segments;

proximity searching, by the computer, the determined set of segments to identify one segment within the searched set of segments that is in closest proximity to the received event location;

identifying, by the computer, a closest offset event location along the identified one segment; and determining, by the computer based on the identified closest offset event location, if the user is to be notified of the event.

10. The method in accordance with claim 9, further comprising:

determining, by the computer based on geographic coordinates of a current travel location of the user, another geographic coordinate area search range;

identifying, by the computer all midpoints of the multiple segments that lie within the other geographic coordinate search range;

determining, by the computer based on the identified midpoints of the multiple segments that lie within the other geographic coordinate search range, another set of segments;

proximity searching, by the computer, the determined other set of segments to identify one segment within the searched other set of segments that is in closest proximity to the current travel location of the user; and identifying, by the computer, a closest offset user location along the identified one segment;

wherein determining if the user is to be notified of the event is based also on the identified closest offset user location.

11. The method in accordance with claim 9, further comprising:

receiving, by the computer from the user via a communications network, the current travel location of the user prior to determining the other geographic coordinate area search range.

12. The method in accordance with claim 10, further comprising:

receiving, by the computer from the user, a route distance to event parameter;

computing, by the computer, a route distance between the identified closest offset event location and the identified closest offset user location;

comparing, by the computer, the received route distance to the computed route distance;

wherein determining if the user is to be notified of the event is based also on a result of the comparison.

13. The method in accordance with claim 10, further comprising:

determining, by the computer based on the received description of an event, a route distance to event parameter;

computing, by the computer, a route distance between the identified closest offset event location and the identified closest offset user location;

comparing, by the computer, the determined route distance to the computed route distance;

wherein determining if the user is to be notified of the event is based also on a result of the comparison.

14. The method in accordance with claim 9, further comprising:

receiving, by the computer from the user, a proximity distance;

computing, by the computer, an offset distance between the identified closest offset event location and the event location; and comparing, by the computer, the received proximity distance to the computed offset distance;

wherein determining if the user is to be notified of the event is based also on a result of the comparison.

15. The method in accordance with claim 9, further comprising:

determining, by the computer based on the received description of an event, a proximity distance;

computing, by the computer, an offset distance between the identified closest offset event location and the event location; and comparing, by the computer, the received proximity distance to the computed offset distance;

wherein determining if the user is to be notified of the event is based also on a result of the comparison.

16. The method in accordance with claim 9, further comprising:

receiving, by the computer, an identification of one or more types of events of interest to the user; and determining, by the computer, that the received description of the event corresponds to the received identified one or more types of events prior to determining the geographic coordinate area search range.

17. A system for determining whether to notify a traveler of events proximate to a travel path, comprising:

a database configured to store, in association with an identifier of a user and contact information for contacting the user while traveling, geographic coordinates defining a start point and an end point of each of multiple contiguous segments between a start location and an end location of a travel path;

a processor configured to (i) receive a description of an event and an event location, (ii) determine, based on geographic coordinates for the received event location, a geographic coordinate area search range, (iii) identify all midpoints of the multiple segments that lie within the determined geographic coordinate search range, (iv) determine, based on the identified midpoints, a set of segments, (v) proximity search the determined set of segments to identify one segment within the searched set of segments that is in closest proximity to the received event location, (vi) identify a closest offset event location along the identified one segment, and (vii) determine, based on the identified closest offset event location, if the user is to be notified of the event.

18. The system in accordance with claim 17, wherein:

the processor is further configured to (i) determine, based on geographic coordinates of a current travel location of the user, another geographic coordinate area search range, (ii) identify all midpoints of the multiple segments that lie within the other geographic coordinate search range, (iii) determine, based on the identified midpoints of the multiple segments that lie within the other geographic coordinate search range, another set of segments, (iv) proximity search the determined other set of segments to identify one segment within the searched other set of segments that is in closest proximity to the current travel location of the user, and (v) identify a closest offset user location along the identified one segment; and the processor determines if the user is to be notified of the event based also on the identified closest offset user location.

19. The system in accordance with claim 18, wherein:

the processor is further configured to (i) receive, from the user, a route distance to event parameter, (ii) compute a route distance between the identified closest offset event location and the identified closest offset user location, and (iii) compare the received route distance to the computed route distance; and the processor determines if the user is to be notified of the event based also on a result of the comparison.

20. The system in accordance with claim 18, wherein:

the processor is further configured to (i) determine, based on the received description of an event, a route distance to event parameter, (ii) compute a route distance between the identified closest offset event location and the identified closest offset user location, (iii) and compare the determined route distance to the computed route distance; and the processor determines if the user is to be notified of the event based also on a result of the comparison.

21. The system in accordance with claim 17, wherein:

the processor is further configured to (i) receive, from the user, a proximity distance, (ii) compute an offset distance between the identified closest offset event location and the event location, and (iii) compare the received proximity distance to the computed offset distance; and the processor determines if the user is to be notified of the event based also on a result of the comparison.

22. The system in accordance with claim 17, wherein:

the processor is further configured to (i) determine, based on the received description of an event, a proximity distance, (ii) compute an offset distance between the identified closest offset event location and the event location, (iii) and compare the received proximity distance to the computed offset distance; and the processor determines if the user is to be notified of the event based also on a result of the comparison.

23. The system in accordance with claim 17, wherein:

the processor is further configured to (i) receive an identification of one or more types of events of interest to the user, and (ii) determine that the received description of the event corresponds to the received identified one or more types of events prior to determining the geographic coordinate area search range.

* * * * *